INVENTORS
F. L. CURRIE
G. G. LIGHT
E. J. BOIVIN
F. T. TURNER
A. E. HILDRETH Jr.
BY M. J. Reynolds
ATTORNEY Aug. 29, 1961 F. L. CURRIE ET AL 2,998,478

PATRON'S TIE-LINE REPERFORATION AND TOP-LINE SIGNAL GENERATING SYSTEM

Filed March 13, 1959 20 Sheets-Sheet 2

Aug. 29, 1961 F. L. CURRIE ET AL 2,998,478

PATRON'S TIE-LINE REPERFORATION AND TOP-LINE SIGNAL GENERATING SYSTEM

Filed March 13, 1959 20 Sheets-Sheet 4

Aug. 29, 1961 F. L. CURRIE ET AL 2,998,478
PATRON'S TIE-LINE REPERFORATION AND TOP-LINE SIGNAL GENERATING SYSTEM
Filed March 13, 1959 20 Sheets-Sheet 5

Aug. 29, 1961 F. L. CURRIE ET AL 2,998,478

PATRON'S TIE-LINE REPERFORATION AND TOP-LINE SIGNAL GENERATING SYSTEM

Filed March 13, 1959 20 Sheets-Sheet 16

Aug. 29, 1961 F. L. CURRIE ET AL 2,998,478

PATRON'S TIE-LINE REPERFORATION AND TOP-LINE SIGNAL GENERATING SYSTEM

Filed March 13, 1959 20 Sheets-Sheet 17

Aug. 29, 1961 F. L. CURRIE ET AL 2,998,478

PATRON'S TIE-LINE REPERFORATION AND TOP-LINE SIGNAL GENERATING SYSTEM

Filed March 13, 1959 20 Sheets-Sheet 19

Aug. 29, 1961 F. L. CURRIE ET AL 2,998,478

PATRON'S TIE-LINE REPERFORATION AND TOP-LINE SIGNAL GENERATING SYSTEM

Filed March 13, 1959 20 Sheets-Sheet 20

United States Patent Office 2,998,478
Patented Aug. 29, 1961

2,998,478

PATRON'S TIE-LINE REPERFORATION AND TOP-LINE SIGNAL GENERATING SYSTEM

Frank L. Currie, Plainfield, N.J., and George G. Light, Scarsdale, Edward J. Boivin, Wantagh, Frank T. Turner, Hampton Bays, and Alan E. Hildreth, Jr., Southampton, N.Y., assignors to The Western Union Telegraph Company, New York, N.Y., a corporation of New York Filed Mar. 13, 1959, Ser. No. 799,307
22 Claims. (Cl. 178—2)

This invention relates to reperforator switching systems and more particularly to a system for the reception of incoming messages from tie-line patrons through a manual printer concentrator and automatically processing said messages in preparation for transmission into a reperforator switching system.

In the present domestic switching system some 15 reperforator switching centers serve all areas of the United States for the transmission of public service telegraphic communications. In this system the branch offices and many tributary offices, manned by experienced personnel, are equipped to transmit their outgoing traffic directly into the reperforator switching systems. Such traffic may be processed automatically and directly through the switching systems without any manual repunching of the messages, or any other manual effort, at the switching centers.

However, most of the tie-line circuits which terminate in patrons' offices and are manned by the patron's personnel have heretofore been operated on a manual basis, that is, with all outgoing traffic from the patron's office being manually repunched at the central office before introduction into the reperforator switching system. This is primarily because the so-called inflexible "top line" information which must form the forepart of each message for its proper automatic handling was considered too exacting in accuracy, and to constitute too much extra work to be delegated to the personnel of most customers.

Basically, the top line must contain information for controlling the selective switching operations of the reperforator switching system, as well as pertinent accounting information for revenue purposes. No deviation from the prescribed format for the selective switching information is permissible, and the accounting information must be sufficiently complete to enable proper billing for the service rendered.

One of the objects of the present invention is to provide a system wherein economies in operation may be effected by eliminating manual repunching of the messages received at a central office from a patron's office and to reduce to a minimum the "top line" information supplied by the patron and the manual operations required by both the patron and central office operator.

Another object is to provide means at the central office for automatically supplying the top line information required by the intra-office switching system.

A still further object is to provide such means for supplying the top line information in association with the concentrator equipment normally provided at the central office for lightly loaded patron's tie-lines.

Still another object is to produce a monitor page printer record of each message received over a patron's tie-line, and including the added top line information, for checking and accounting purposes.

A further object is to increase the speed of transmission through the central office of messages received over patrons' tie-lines.

Other objects and advantages will hereinafter appear.

In accordance with the present invention a plurality of patrons' tie-lines terminate in printer concentrator line jacks at a central switching office. When the line patron desires to send a message, he sends a request (open line) signal which lights a lamp at the concentrator jack turret. The central office operator then inserts a cord circuit plug in the patron's line jack. This is the only operation required by the central office operator. The cord circuit connects the line circuit to the line relay, thereby reversing battery on the line via the line relay and thus starting the patron's printer motor, all in accordance with standard concentrator operation practice.

The patron now sends the selection codes for the area of destination of the message, followed by a letters space code. The transmitting patron then awaits the insertion at the central office of certain top line information, to be described below, before proceeding with the message.

The cord circuit reads the space code from contacts on the receiving reperforator and in response thereto the cord circuit will seize equipment for generating the top line information. The equipment then proceeds to generate and send both to the cord circuit printer-perforator and to the patron the top line information including the area of origin of the message, the cord circuit identity, the message sequence number, the tie-line identity, the city of origin and the date and time, after which the top line generator is released.

When the patron observes that this information has been recorded on his printer, he proceeds to send the message and the end-of-message disconnect codes. These are recorded on the cord printer-perforator and when the end-of-message is read on the printer-perforator contacts, the cord circuit seizes a line feed signal generator which sends an acknowledgment, that the message has been received, consisting of eight line feed code combinations and then releases.

Upon release of the line feed signal generator the cord circuit initiates automatic metering out of the tape from the printer-perforator and a timer starts to measure seconds. If after a predetermined time, for instance 10 seconds, the patron does not start a new message, the cord circuit disconnects the tie-line and lights a disconnect lamp at the turret. The operator then removes the cord plug from the tie-line jack.

The tape from the printer-perforator is processed in turn through an intra-office transmitter and a monitor transmitter. The intra-office transmitter effects the transmission of the message over the central office reperforator switching system, which system per se forms no part of the present invention. The monitor transmitter idles tape under control of an idling step pulse while the characters are read on associated control relays which read for a character other than blanks, letters, line feeds and carriage returns. When such other character is sensed by the transmitter, the control relays disconnect the transmitter step magnet from the idling step pulse circuit and seize an idle monitor printer and associated tape-to-page translator, and start transmission to the monitor page printer. When the end-of-message code signal is read, the transmitter is disconnected and returned to its normal condition again permitting the tape to idle through blanks, letters, line feeds and carriage returns.

The invention will best be understood by reference to the accompanying drawings in which:

FIGS. 1, 2 and 3 comprise a simplified schematic circuit diagram of a cord circuit receiving position and line feed generator to illustrate the general circuit theory of the invention;

FIGS. 4 to 19 when arranged as shown in FIG. 21, show detail circuits of a system involving the present invention, among which;

FIGS. 8 to 13 show the first or A section of the top line generator, among which;

FIG. 8 shows the A section cord circuit finder switch and tape tie-up switch;

FIG. 9 shows the A section top line transmitting relays and associated distributor;

FIG. 10 shows the A section program switch;

FIG. 11 shows the character code generating matrix;

FIG. 12 shows the tie-line identification switch and associated relays;

FIG. 13 shows the automatic numbering machine;

FIGS. 14 to 18 show the second section of the program switch and associated relays, among which;

FIG. 15 shows the B section top-line transmitting relays and associated distributor;

FIG. 16 shows the B section program switch;

FIG. 17 shows the time and date program switch and date switches;

FIG. 18 shows the time switches;

Figure 1:
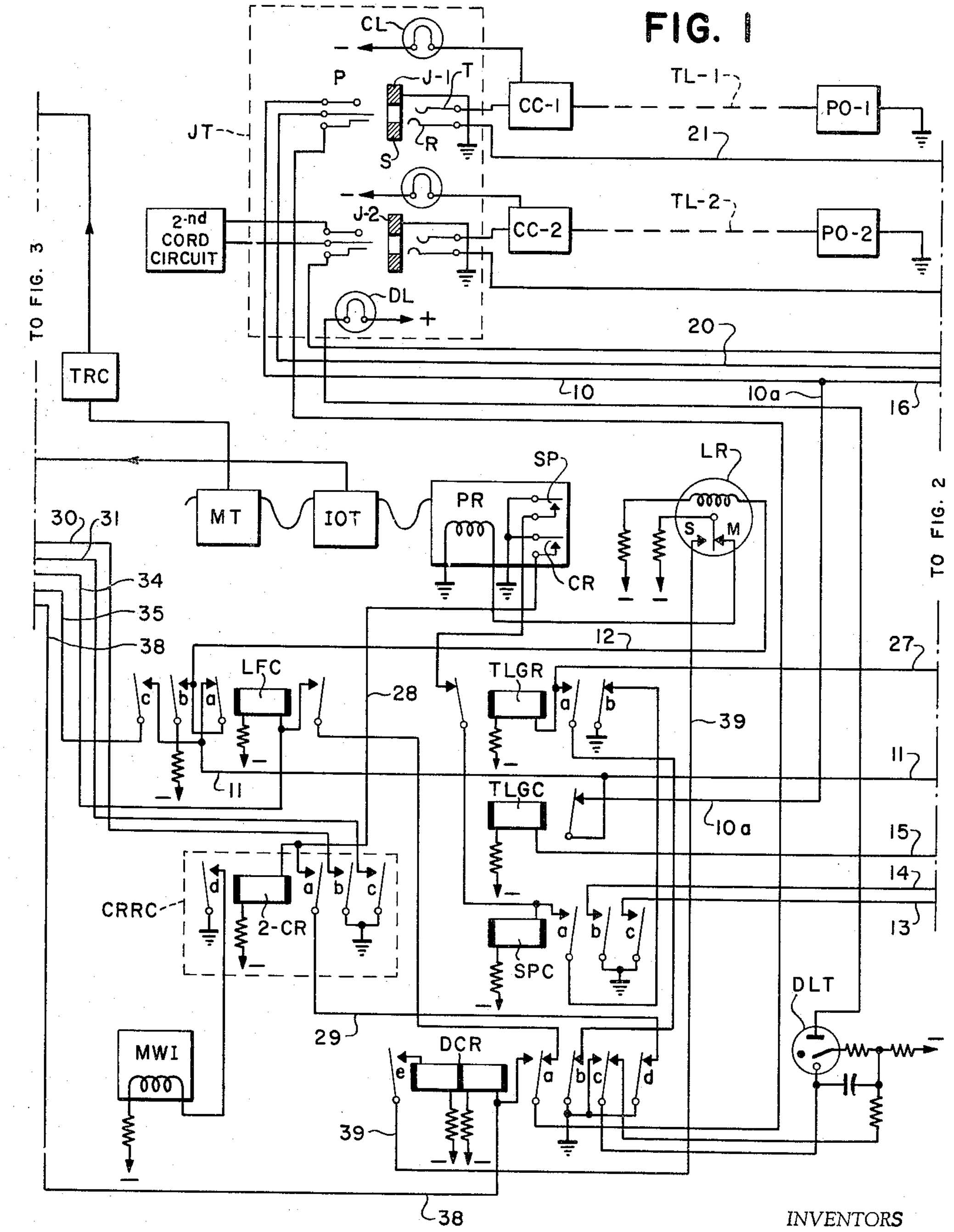

Referring first to the schematic showing of FIGS. 1, 2 and 3, each patron's office, such as PO–1, PO–2, is provided with a receiving printer and keyboard transmitter, later to be described, connected over the tie-lines TL–1, TL–2, etc., to printer concentrator jacks J–1, J–2, etc., at the central office jack turret JT, in conventional manner.

At the central office a number of cord circuit receiving positions less in number than the number of tie-lines is provided. Each receiving position has a cord and plug P terminating at the jack turret together with the packs J–1, etc.

The plug and jack turret permits any idle cord circuit to be connected to any tie line. Each plug and jack provides three conductor connections. The tip connection T serves for the tie-line circuit, the ring R for the automatic tie-line identification, as will appear, and the grounded sleeve S for the cord circuit receiving position hold circuit.

The cord circuit receiving position serves primarily for recording the message from a top line generator and from the customer in a form in which it may be resent to the central office switching system and to the page monitor printers.

The cord circuit receiving equipment consists essentially of a printer-perforator PR for recording the message on a tape, an intra-office transmitter IOT and a monitor transmitter MT through which the tape from the printer-perforator passes successively. The intra-office transmitter sends into the intra-office circuits IOC (FIG. 2) of the reperforator switching system, either directly or through line finder switches LF. As stated, these intra-office switching circuits form no part of the present invention, being fully disclosed in U.S. Patents 2,575,329 and 2,582,707, granted November 20, 1951 and January 15, 1952 to Blanton et al. and Light et al., respectively.

The monitor transmitter MT is provided to enable a typed page copy of each message for servicing and accounting purposes. This transmitter works into one of a group of page printers MP–1, MP–2, etc., all printers being available to all transmitters through control relays TCR, line finder switches LFS, and printer control relays PRC.

The patron in placing a request to transmit opens the line circuit momentarily, either by means of a line push button or by starting the printer motor, depressing one of the character keys and then stopping the motor. The short open releases a relay in the concentrator controls CC–1 or CC–2, in series with the line at the central office, to release and lock itself released. Its release lights the calling lamp CL in the jack turret for the respective tie line. The central office turret operator answers the call by inserting a plug P of an idle cord circuit receiving position into the jack.

This connection extends the line circuit over conductor 10, tongue and back contact of relay TLGC, conductor 11, tongue (*a*) and back contact of relay LFC, conductor 12 and winding of line relay LR to negative battery, thus through the control relays CC–1, etc., reversing the tie-line potential from positive to negative. Positive potential is used for standby and negative for operate. Application of negative potential to the tie-line activates a motor control polar relay at the patron's office to start the patron's teleprinter motor in accordance with standard practice, as will later appear. The starting of the motor signals the patron that the central office connection is completed whereupon he sends the area selection characters for the geographical destination of the message and the "space" character. The destination selection characters are reported by the line relay LR to the printer-perforator PR and are recorded thereon. The succeeding "space" character operates the space contact SC of the printer-perforator and thus, over back contact and left tongue of relay TLGR, operates the space relay SR. Relay SPC locks up through the back contact of relay TLGR.

The top line generator (FIG. 2) is common to all cord circuit receiving positions and upon operation of relay SPC the particular cord circuit in use will seize the top line generator. At tongue (*b*), relay SPC, over conductor 14 grounds one point or level of the cord finder switch CFS, which point is individual to the particular cord circuit. At tongue (*c*), relay SPC over conductor 13, grounds the finder switch stepping magnet SM–1 and causes the switch to step to the grounded point. When this occurs, ground from relay SPC over conductor 14 energizes the mark relay MR–1, interrupting the stepping circuit.

Relay MR–1 locks up at tongue (*a*) and applies ground at tongue (*b*) through level 2 of the rotary switch and conductor 15 to operate relay TLGC, thereby opening the connection between conductors 10 and 11 and extending the line circuit from conductor 10 over conductor 16, level 4 of switch CFS, conductor 17, marking contact M of the top line generator line relay TLR, the armature thereof, conductor 18, level 3 of the rotary switch and conductor 11 through the winding of line relay LR, thus inserting the contacts of the top line relay TLR in the tie-line circuit whereby operation of the same by the top line generator transmits to the central office printer-perforator PR through relay LR and over the connected tie-line to the patron's printer. The winding of relay TLR is in series with the winding of a monitor top line relay MTLR and the solid ring R–1 of a distributor TLD. The grounded armature of relay MTLR is connected through the marking contact M of the relay to the top line monitor top line printer TLMP so that this printer also copies the top line information supplied by the top line generator, whereby a continuous tape record is made of all top line messages in the order of their connection to the top line generator.

A typical top line for a message originating over the tie-line having the designation TAC, at Detroit and destined for the Syracuse area may be as follows:

SY(Sp)DE(Sp)DEF(Fg)001(Lt)(LF)
WUX(Sp)TAC(Sp)DETROIT(Sp)
MICH(Fg)31(Sp)1035(Lt)AME(Sp)

The codes and numerals employed in the top line information have the following meanings:

SY—Syracuse (the routing symbol for the area of destination)
(Sp)—a spacing code combination
DE—Detroit (the area of origin)
DEF—Detroit, cord circuit—(the original switching office and cord circuit identity)

(Fg)—a figures shift code combination
001—message sequence number
(Lt)—a letters shift code combination
(LF)—a line feed code combination
WUX—Western Union tie-line
TAC—tie-line identity
DETROIT MICH—city of origin
31—day of month
1035 AME—time and meridian, Eastern zone In the above illustration the selection code SY (space) is received from the patron. The remainder of the top line is provided by the top line generator.

Figure 2:
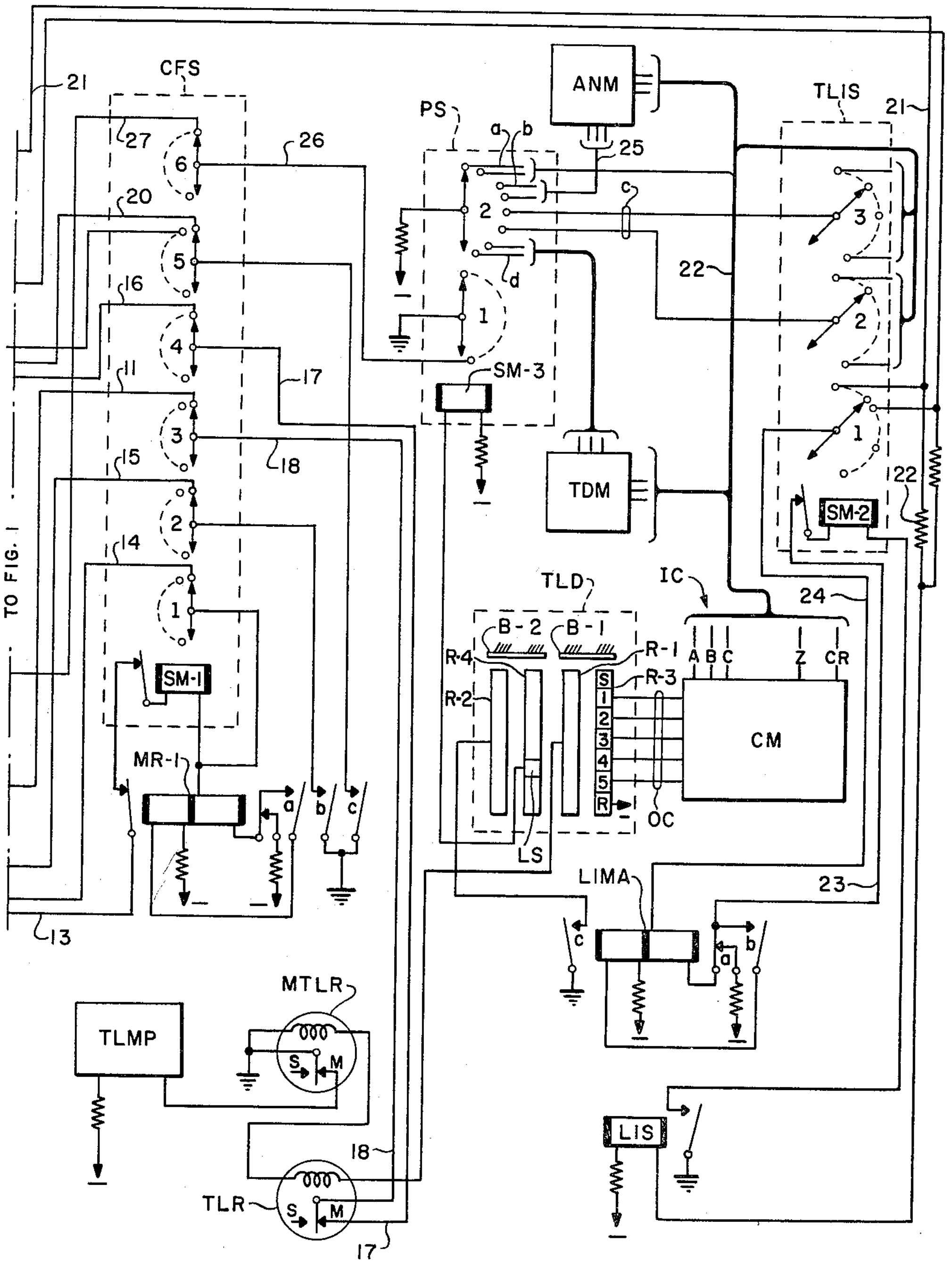

In addition to the cord circuit finder switch CFS, relays MTLR and TLR, distributor TLD and printer TLMP, the top line generator includes a tie-line identification switch TLIS and associated line identity start relay LIS; a program switch PS to direct and serialize in proper order the different characters forming the top line information; a code generating matrix CM for converting the programmized top line characters into the 5-unit teleprinter code; an automatic numbering machine ANM, to number the messages sequentially in the order in which the top line generator is connected; a time and date machine TDM to provide the time and date for each message and a number of control relays, one only, the line identity mark relay LIMA of which is shown in FIG. 2.

It is to be understood that the schematic diagrams of FIGS. 1 and 2 are presented to illustrate the theory only of the cord circuit and associated equipment and for reasons of simplicity does not conform fully with the actual circuit details shown in FIGS. 4 to 19.

Thus, with a cord circuit plugged up, the selection code (space) received from the patron on the printer-perforator PR and with the top line generator cut in by operation of finder switch CFS, the system is in condition to generate the top line information. At the instant the mark relay MR–1 operated, with the finder switch in the connected cord circuit position, ground is applied at tongue (*c*) of relay MR–1, the fifth level of switch CFS, conductor 20, plug P, jack ring R and conductor 21 to operate the line identification relay LIS. Conductor 20 also marks a point on level 1 of the line identification switch TLIS individual to the jack J–1 and hence to the line TL–1. A high resistance 22 maintains the level 1 point of switch TLIS substantially at ground potential. Relay LIS grounds one terminal of the winding of step magnet SM–2 of switch TLIS, the circuit being completed over conductor 23 and the contact (*a*) of relay LIMA. When switch TLIS has stepped to this grounded point, corresponding to tie-line TL–1, ground is extended through the wiper of level 1 and conductor 24 to operate relay LIMA, and thus interrupt the stepping circuit for relay LIMA through its left winding, its tongue (*b*), and stepping magnet SM–2 to ground.

Relay LIMA at contact (*c*) applies ground to the solid ring R–2 of distributor TLD so that as brush B–2 rotates, it will once each revolution pulse the step magnet SM–3 of the program switch PS through a local segment LS of ring R–4. At each such step the program switch completes a circuit to a selected character input of the matrix network CM.

The distributor segmented ring R–3 has a start segment, five code segments 1 to 5 connected to the five output conductors OC of the matrix network, and a rest segment connected to negative potential. The matrix network has an input conductor IC corresponding to each letter of the alphabet and printer functions, such as carriage return, line feed and the like. Certain of the conductors are also used for numerical digits, all of which will appear from the subsequent detailed description of the system. It is sufficient for the present to know that when potential is applied to any input conductor, such as conductor A, the code combination corresponding to the grounded conductor, such as the A character code, will be set up on the output conductors OC and applied to the code segments 1 to 5 of the distributor for operation of the line and monitor relays TLR and MTLR.

The first group (*a*) of contacts of the program switch apply potential, via cable 22, in succession to the IC conductors corresponding to the area of origin designation of the message, namely, in the example given "DE(Sp)"; then the Detroit "F" cord circuit identification codes, i.e. "DEF(Fg)." All of these codes are fixed and are obtained directly from the program switch, except the cord circuit designation "F" which is obtained from the setting of the cord circuit finder switch CFS, as will appear from the detailed description of the system.

The next group (*b*) of contacts of switch PS, via cable 25 activate the automatic numbering machine ANM, to in turn drive the matrix over cable 22, to generate codes corresponding to the hundreds, tens and units digit of the next sequential number for the message, namely, the "001" of the illustration.

The next group of fixed characters, namely

"(Lt)(LF)WUX(Sp)T"

are obtained directly from points of the program switch, not shown in FIG. 2. Following these contact group (*c*) of switch PS apply potential through the selected contacts of the top line identification switch TLIS to the input conductors IC of matrix CM to generate the "AC" characters of the "TAC" code group, comprising the identification symbols for the particular tie-line.

In actual practice the program switch PS is composed of two parts and following the generation of the tie-line identification code "TAC" the first part releases so that it may be available for use by another cord circuit, and the second part continues to supply the top line information. The second part of the program switch is provided in duplicate so that one such second part will be available when the first part releases. This arrangement will appear in the detailed description. However, for simplification in the schematic drawing of FIGS. 1, 2 and 3 the single program switch PS is shown having a set of contacts (*d*) for activating the time and date machine TDM which in turn activates the matrix CM to supply the time and date information, i.e., the "31(Sp)1035(Lt)AME(Sp)"

of the illustration.

At the completion of the program switch cycle, ground at level 1 of switch PS is applied by conductor 26, level 6 of switch CFS, and conductor 27 to operate relay TLGR. This relay locks up at armature (*a*) and back contact and armature (*b*) of disconnect relay DCR. Relay TLGR, at tongue (*b*) opens the holding circuit for the space relay SPC, which at tongue (*c*) unlocks the mark relay MR–1 (FIG. 2) and at tongue (*b*) removes ground from the stepping magnet SM–1 of the cord circuit finder switch CFS, thus releasing the top line generator and making it available to another cord circuit.

The release of the mark relay MR–1 removed the ground at its tongue (*b*) from the top line generator connect relay TLGC thus reestablishing the connection from tie line TL–1 over conductors 10, 10*a*, released armature of relay TLGC, conductor 11, and contacts of relay LFC to the winding of the line relay LR, whereby the line relay becomes responsive to signals originating at the patron's keyboard for operation of the printer-perforator.

The completion of the top line on the patron's printer and the cessation of transmission from the top line generator is the signal to the patron's operator to start sending the menage by keyboard operation of his teleprinter. The message, when completed is terminated by an end-of-message disconnect signal consisting of two carriage return codes. All of this transmission is recorded by the printer-perforator PR of the connected cord circuit receiving position in tape form.

When the end-of-message signal is received by the printer-perforator the carriage return contacts CR thereof close twice in succession and, over conductor 28, operate a relay chain CRRC terminating in a relay 2–CR. The operation of 2CR (1) completes at tongues (*b*) and (*c*) the circuits for effecting a connection of the eight-line feed generator LFG (FIG. 3) to the cord circuit receiving equipment, (2) at tongue (*d*) effects advancement of the message waiting indication MWI, one step, (3) causes the printer-perforator PR to feed out a measured length of blank tape as will later appear, and (4) locks up over tongue (*a*) conductor 29 and tongue (*d*) of disconnect relay DCR.

Tongue (*b*) of relay 2–CR applies ground over conductor 30, winding of the 8 line feed start relay LFS and tongue (*b*) of the eight line generator mark relay LFM, to battery; and tongue (*c*) of relay 2–CR applies ground over conduction 31 to one point of level 1 of the 8-line feed generator finder switch LFFS, this point being individual to the particular cord circuit in use. In addition to the equipment mentioned above, the 8-line-feed generation includes a program switch LFPS and a distributor LFD. Operation of start relay LFS prepares a circuit for the mark relay LFM from the grounded point, level 1 of the finder switch LFFS, conductor 32 to the right winding of the mark relay and contact (*c*) thereof to the made armature (*a*) of the start relay LFS. At tongue (*b*) the start relay completes the stepping circuit for step magnet SM–4 of the finder switch from ground at level 1 of the program switch LFPS and back contact of its step magnet SM–5; this circuit extending through the winding of SM–4, its break contact and contact (*c*) of mark relay LFM to battery at tongue (*a*) of relay LFS. The finder switch steps until the grounded point of level 1 of the switch is reached, whereupon the mark relay LFM operates to interrupt the stepping circuit. The operation of the mark relay connects the stepping segment SS of the ring R–4 of the distributor LFD, through tongue (*d*) of relay LFM to the winding of the program switch stepping magnet SM–5. It will be understood that the brushes of the distributor are continuously rotating and on each revolution thereof the program switch will be advanced one step.

The mark relay LFM at tongue (*e*) applies ground over conductor 33, the selected point, level 2 of the finder switch and conductor 34 to the winding of line feed connect relay LFC. This relay disconnects the tie-line from the cord circuit line relay, at tongue (*a*), and connects the tie-line from conductor 11, tongue (*c*) of relay LFC, conductor 35, selcted point, level 3 of the finder switch and conductor 36, to the solid ring R–1 of the distributor. When the program switch is stepped from its normal position of rest, marking battery is applied at level 2 thereof, to the rest and second segment of ring R–3 of the distributor to set up a line feed code combination thereon. This is repeated to the tie-line over the circuit just traced. Thus, as the program switch steps through a cycle of eight steps, eight line feed characters will be transmitted to the patron's page printer causing the printer to feed out eight lines of blank paper sufficient to enable the message to be severed from the continuous web fed through the printer. It also serves as an acknowledgment that the message has been received at the central office.

At the end of its cycle the program switch applies ground at its level 3, conductor 37, selected point, level 4 of the finder switch and conductor 38 to the winding of the disconnect relay DCR. Operation of relay DCR releases the line feed connect relay LFC and the 2–CR relay. Release of the 2–CR relay releases the 8-line-feed generator and makes it available to another cord circuit.

The disconnect relay at tongue (*b*) also releases the top line generator release relay TLGR and at tongue (*c*) applies ground to a disconnect timer DLT to start its timing cycle. At the end of the timing cycle, say 10 seconds, the tube DLT conducts, lighting the turret disconnect lamp DL. Removal of the plug from the jack causes the disconnect relay DCR to release and lamp DL to extinguish.

If the patron has additional messages, he may within the timer interval hold the cord circuit connection. The first spacing pulse from the patron applies battery through the space contact of the line relay LR over conductor 39 and preliminary make contacts (*e*) of the disconnect relay to release the relay and extinguish the light DL.

As the tape is punched by the printer-perforator PR, the blank tape and carriage return characters ahead of the telegram being received are idled through the intra-office transmitter IOT until the first character in the message is reached by the transmitter pins. The tape then stops until the message recording is finished and the message waiting indicator MW1 has been stepped from its zero position by the end-of-message characters.

Figure 3:
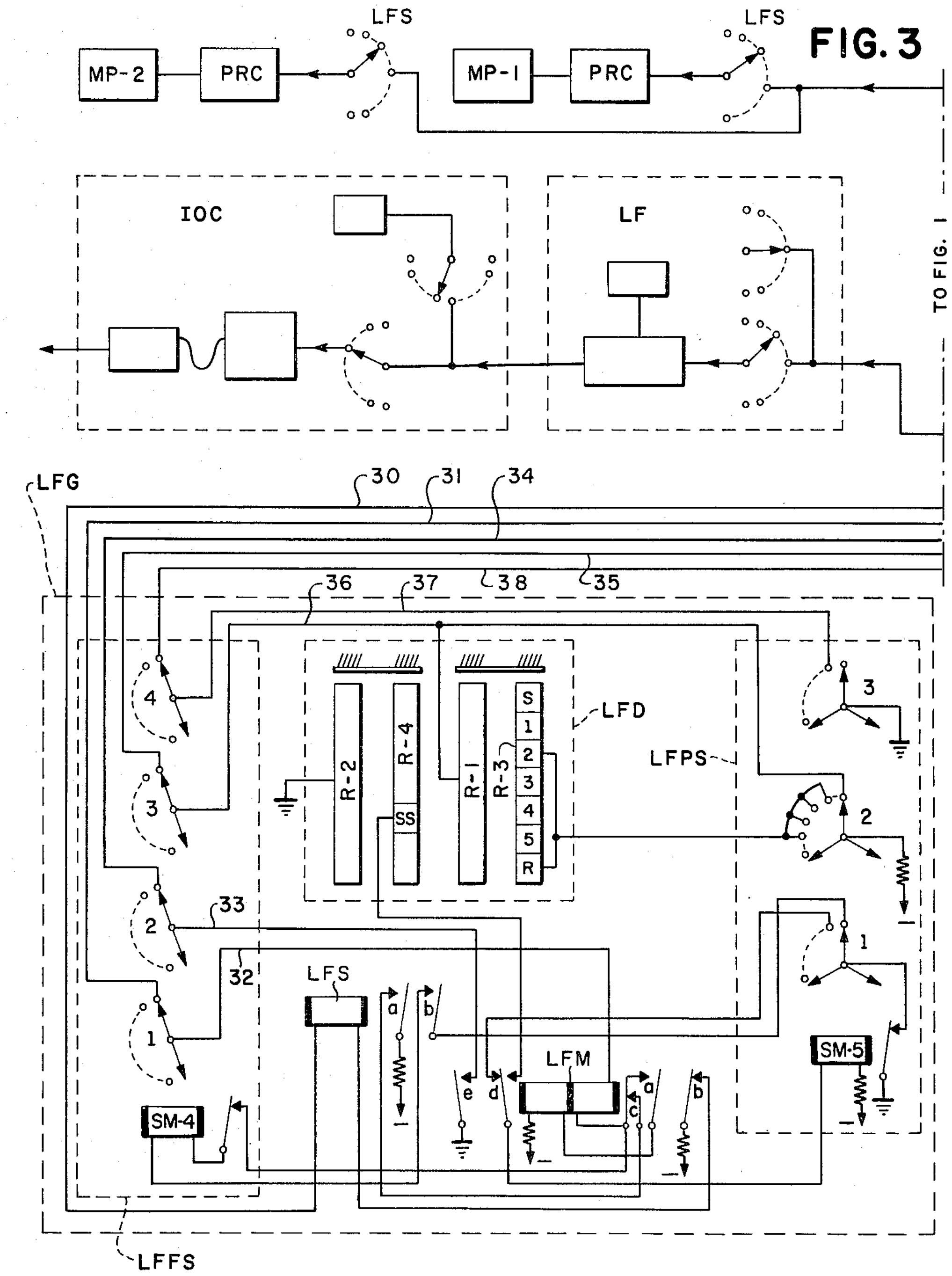

The output circuits from the intra-office transmitter IOT may be connected directly to the intra-office switching circuits IOC or through line finders LF, as shown in FIG. 3. These intra-office circuits, as stated, form no part of the present invention, it being sufficient at this point to state that with a completed message in the tape and the transmitter IOT connected to an idle intra-office switching circuit in accordance with the disclosure of this aforesaid Blanton et al. patent and Light et al. patent the message will be read out of the transmitter and sent to its proper destination. Since messages originating from the lines in the manner here set forth are not necessarily taken in the intra-office switching system in the order in which the top lines are generated, no comparison of the cord circuit designation letter or message number is made by the standard message sequence indicators of the intra-office system.

The top line readback for comparison purposes would in the example given consist of DE (Space) DEF (Figs.) 001 (Ltrs) (line feed). All of these characters are compared except the variable characters, namely "F" (cord circuit identification) and "001" (message number). These characters are counted but not compared.

With the general plan of operation of the system as described above in mind, a detailed description of the system by reference to FIGS. 4 to 19 will be given.

*Patron's equipment*

Figure 4:
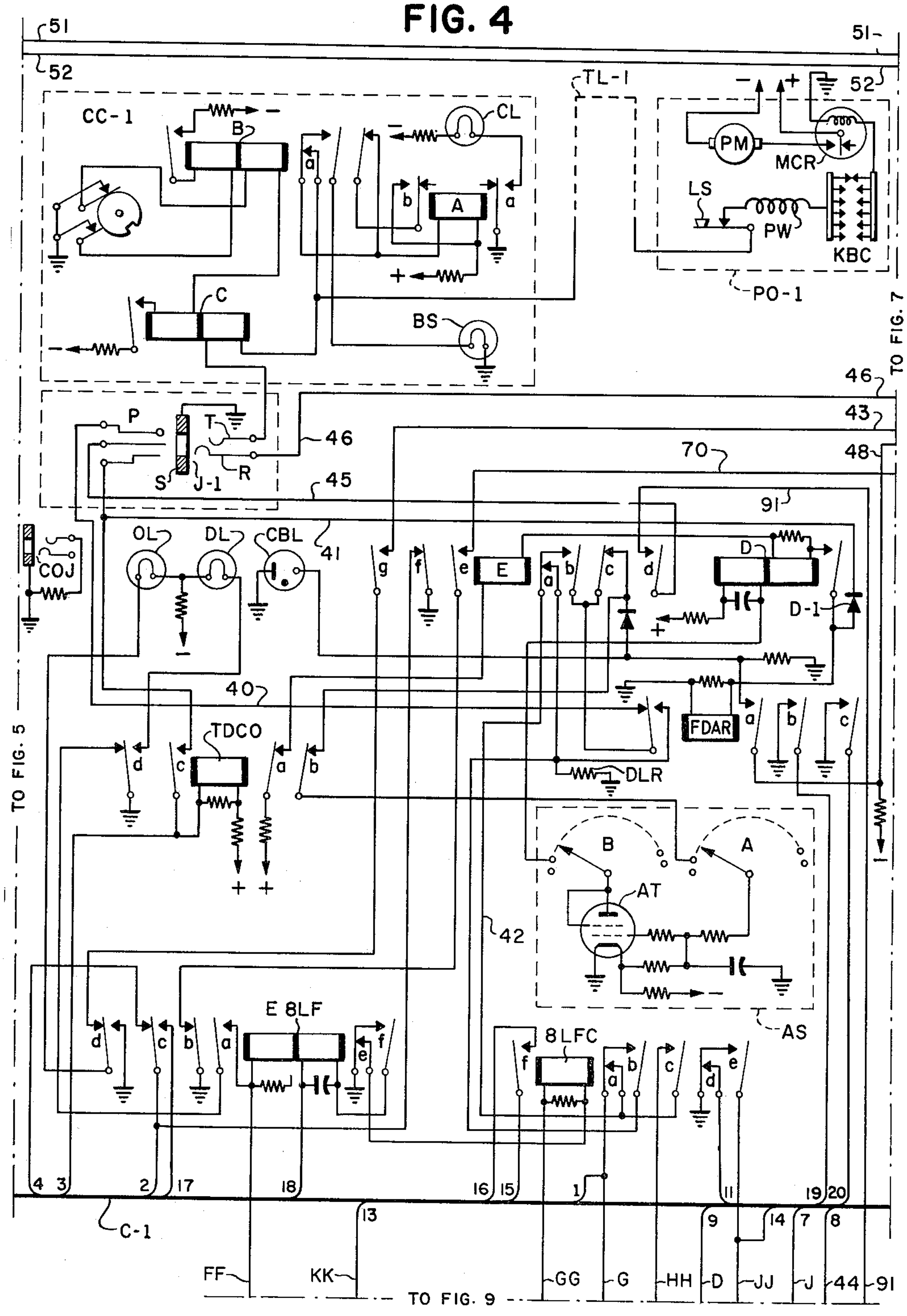
FIGS. 4 to 7 show the patron's equipment and the central office cord circuit.

Referring next to FIG. 4, the equipment at a patron's office PO–1 includes a page printer, represented by the printer winding PW, a keyboard transmitter, represented by the contacts KBC, a drive motor PM, a line switch LS and a polar motor control relay MCR. The line circuit extends from ground, through relay MCR, contacts KBC, winding PW and switch LS to the tie-line TL–1, and thence to the central office where it terminates in the control circuits CC–1, the circuit there extending through contact (*a*) of relay B and winding of relay A, to positive battery. This positive battery is the normal at rest potential on the line and holds polar relay MCR at the patron's office on its right contact with motor PM deenergized. When negative operating battery is applied to the line, relay MCR acts to energize the printer motor.

When the patron's operator has a message to transmit, he depresses key LS to momentarily open the line. At the central office this open condition releases relay A, which at tongue (*a*) energizes the call lamp CL and at tongue (*b*) shunts out the winding of relay A, so that lamp CL remains energized. The circuits CC–1 are identical with those shown in Blanton U.S. Patent No. 1,880,-723, issued October 4, 1932.

*Cord circuit*

The central office operator, observing the calling lamp CL, plugs an idle cord circuit plug P into the calling jack J–1, thus extending the tie-line circuit through the tip T of the jack J–1, conductor 40, left tongue and back contact of false disconnect relay FDAR, tongue (*c*) of conductor seize relay E, back contact and tongue (*b*) of timer disconnect relay TDCO, to one point of the right level (A) of allotter switch AS. The purpose of the allotter switch is to prevent two cord circuits from being simultaneously connected to a tie-line at different turret positions. It has two levels A and B, each cord circuit having an individual position on each level. The wipers continuously rotate and when they engage the contact individual to the particular cord circuit which is connected to the tie-line, the positive potential from the control circuits CC–1 is extended to the grid of a normally blocked tube AT, to momentarily allow the same to discharge through the corresponding point of level B of the allotter switch and left winding of relay D, to operate the same. Relay D locks up from battery at tongue (*a*) of relay TDCO, winding of relay E, right holding winding of relay D, its contacts and conductor 41 to the grounded sleeve S of jack J–1.

With cord seize relay E operated the tie-line circuit is extended from conductor 40 and left tongue of relay FDAR through the made tongue (*b*) of relay E, conductor 42, contact (*a*) of the eight line feed connect relay 8LFC, lead 1 of cable C–1 and (FIG. 5) through the back contact and tongue (*a*) of printer cut-off relay PPCO, conductor 50, the winding of the line relay LR and thence to negative battery. This negative battery when applied to the control circuits CC–1 (FIG. 4) operates the C relay thereof, which in turn operates relay B to remove positive battery from the line. Operation of relay B also reoperates relay A to extinguish the call lamp CL and light busy signal lamp BS. The negative battery is thus extended to the patron's office to operate the polar relay MCR to start the patron's printer motor. This is a signal to the patron that the cord connection has been completed and that keyboard transmission may commence.

*Busy tie-line.*—If the operator has mistakenly plugged up a tie-line busy through another turret, the lack of positive battery at the control circuits CC–1 would not have caused allotter tube AT to fire and relays D and E of the cord circuit would not have operated. Also the cord circuit busy lamp CBL would be lit from negative battery from the busy cord circuit through the jack tip T, conductor 40, tongue (*c*) and back contact of relay E to the lamp CBL.

However, assuming the tie-line not to be busy, relay E operates as described, and in addition to applying negative battery to the line, it removes a dummy load resistor DLR at its contact (*a*) which heretofore completed a circuit through the winding of line relay LR to hold it on its marking contact. Relay E also operates operate lamp OL from battery at the lamp, tongue (*d*) of relay E8LF, made tongue (*g*) of relay E, conductor 83, tongue (*b*) and back contact of relay B–2 (FIG. 7) and flasher contacts FC to ground.

*False call timer.*—Relay E also removes ground from the starting anode of the timer tube FCTT of the false call timer FCT (FIG. 6) over lead 2 of cable C–1, and tongue (*f*) of relay E (FIG. 4). If no characters are sent by the patron within 20 seconds, the false call timer tube will fire to operate relay TDCO (FIG. 4) from positive battery through the relay winding, lead 3 of cable C–1 and tube FCTT to ground. Relay TDCO, if so operated, (1) locks at its armature (*c*) and sleeve S of the jack J–1; (2) opens at tongue (*b*) the circuit to the allotter AS; (3) at tongue (*a*) removes battery from relays D and E, effecting their release to disconnect the patron; and (4) at tongue (*d*) operates the disconnect lamp DL, thus signaling the turret operator to remove the jack.

Figure 5:
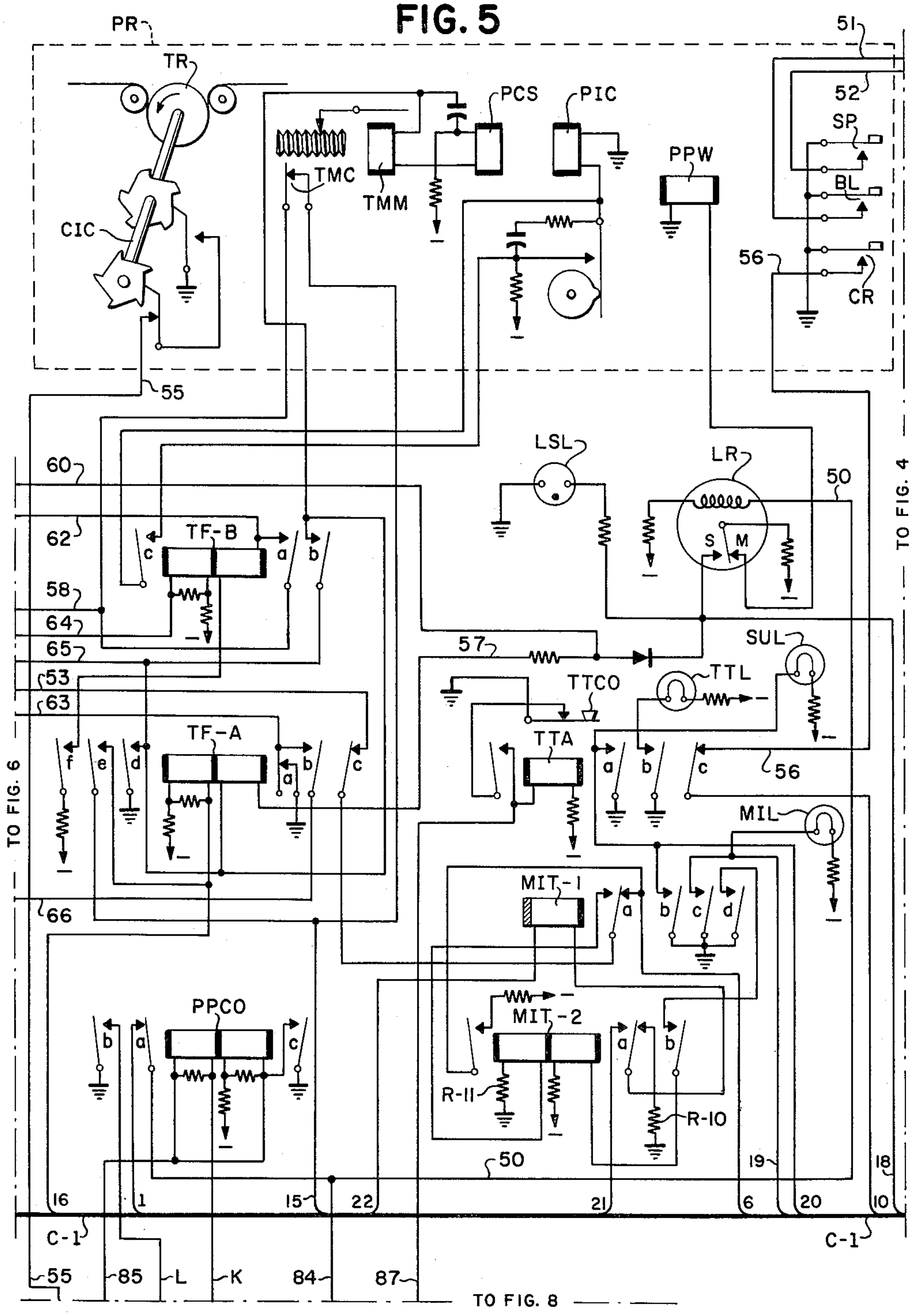

*Character identification relays.*—Normally the customer will begin sending within this 20 second interval and the first received character will operate the "bail" contact BL of the printer-perforator PR (FIG. 5) completing a circuit from ground through the conductor 51, tongue (*d*) and back contact of relay B–2 (FIG. 7) to the winding of bail relay B–1. Relay B–1 operates and prepares a circuit at its tongue for the winding of relay B–2, conductor 70, made tongue (*e*) of relay E (FIG. 4) and back contact and tongue (*b*) of relay E8LF to ground. At the end of the bail operation the bail contacts BL open and current through the winding of relay B–1 will flow through the left winding of B–2 to operate the same. Relay B–2 at armature (*b*) changes the operating lamp OL from a flashing to a steady state; at tongue (*a*) it completes a circuit from the spacing contacts SP of the printer perforator over conductor 52 and tongue (*a*) of relay B–2 to the right winding of space relay SPC; at tongue (*c*) of relay B–2 ground is reapplied via lead 4 of cable C–1, tongue (*c*) of relay E8LF and lead 2 of cable C–1, to the timing tube FCTT, to discontinue the timing operation thereof; and at tongue (*e*) of relay B–2 negative battery is removed, via lead 5 of cable C–1, and hence from the starting anode of the message incomplete timer tube MITT (FIG. 6) and the starting anode circuit is extended by the front contact and tongue (*e*) of the B–2 relay, over lead 6 of cable C–1, back contact and tongue (*a*) of the message incomplete relay MIT–1 (FIG. 5) and thence by tongue (*c*) of relay TF–A, conductor 53, lower tongue of tape feedout switch TFO (FIG. 6) and conductor 60 to ground at the line signal lamp LSL (FIG. 5). A parallel connection to the spacing contact S of line relay LR prevents the timer tube MITT from operating during message transmission, but should no signals be sent for a predetermined period, say 90 seconds, the relay armature will remain on its marking contact M and tube MITT will fire to operate lamp MIL, as will later appear.

As previously stated, the first two characters sent by the patron will be the area of destination code, such as "SY" for Syracuse, followed by a "space" signal. These codes are received on the cord circuit line relay LR (FIG. 5) and repeated from the marking contact thereof to the winding PPW of the cord circuit printer-perforator PR.

*Top-line generator (first half)*

As previously indicated, the top line generator is composed of two sections, the first of which generates the fore part of the top line, i.e., in the example through the tie-line identity group "ZGH." The remaining portion, starting with the city of origin, is generated in the second section of the generator. Since normally the second portion is longer than the first, the second part is provided in duplicate so that one of the duplicate parts will always be available when the first section completes its cycle. The first section includes the cord circuit finder switch CFS–A and associated equipment shown in FIGS. 8 to 13; one unit of the second section includes the cord circuit finder switch CFS–B and associated equipment, shown in FIGS. 14 to 18. The duplicate unit of the second part includes a finder switch CFS–C and associated equipment shown diagrammatically on the lower half of FIG. 15.

When the "space" character is received on the printer-perforator (FIG. 9) the space contacts SP thereof are closed to cut in the top line generator. For this purpose ground at the space contacts SP is extended by conductor 52, and thence (FIG. 7) through the made tongue (*a*) of relay B–2 to the right winding of the character space relay SPC. SPC locks up through its right armature, conductor 71, back contact and armature (*b*) of relay UR, thence through conductor 72 and back contact and left tongue of relay CR–2A to ground.

*Cord circuit finder switch.*—The space relay SPC applies ground over its tongue (*b*) and lead 7 of cable C–1, which (FIGS. 4 and 9) becomes conductor J of cable C–2, extending (FIG. 8) to one point of level A of the cord circuit finder switch CFS–A, on which each cord circuit has an individual point. The ground is extended from the level A wiper and right winding of the cord circuit mark relay CSAM and contact (*a*) thereof to battery, thus preparing relay CSAM to operate when switch CSF–A steps to the grounded point.

The space relay SPC (FIG. 7) also grounds lead 8 of cable C–1, which extends (FIGS. 4 and 9) via conductor 44 and tongue (*b*) of the PAC–2 relay and continues by conductor 90, through back contact and tongue (*f*) of mark relay CSAM (FIG. 8) contacts of the stepping magnet SM–1A, its winding and contact (*a*) of relay CSAM to battery, causing switch CFS–A to step until its contact (level A), which was grounded by conductor J, as described, is reached. When this occurs mark relay CSAM operates through its low resistance right coil, which shunts the step magnet and interrupts the stepping circuit. Relay CSAM locks up through its high resistance left coil, tongue (*b*) and grounded point of level A of the finder switch.

*Top line timer.*—Relay CSAM at its tongue (*g*) removes ground normally extending over conductor **80*a* to the starting anode of a top line timer tube TLTA (FIG. 14) and applies this ground over conductor 80*b*** to the cathode of the tube so that it will operate through relay TLT to light a trouble lamp TLL, if the first half of the top line is not completed and relay CSAM released within a predetermined time, as 5 seconds.

Relay CSAM at its tongue (*e*) prepares a circuit over conductor 81 for later operation of the tape tie-up relay TTP1, and the consequent operation of relay TTP2 and tape tie-up counting switch TTS. At tongue (*d*) relay CSAM applies ground over conductor 82 to the tongue (*a*) of relay PAC–1 for later use.

*Tie-line identification switch*

Relay CSAM at its tongue (*c*) applies ground through the E level of finder switch CFS–A, conductor E of cable C–2, and thence from conductor E (FIG. 9) over conductor 91, made contact (*d*) of seize relay E (FIG. 4), conductor 45, ring R of the jack and plug, conductor 46 (FIGS. 7 and 12) and through one of the high resistance isolating resistors 22 to the winding of the line identification start relay LIS, to operate the same. Conductor 46 also grounds a point of the tie-line identification switch TLIS, which has one point on either level A or B individual to each tie-line jack.

The operation of relay LIS completes the stepping circuit for step magnet SM–2, from ground at the made tongue of relay LIS, its contacts, winding of SM–2, conductor 120, contacts (*a*) of line identification mark relays LIMB and LIMA in series, to battery. Switch TLIS thus steps until its grounded point at level A is reached, whereup on mark relay LIMA operates to interrupt the stepping operation. The circuit for relay LIMA extends from the grounded point, level A, of switch TLIS, left winding of LIMA, conductors 121, 120 and contacts (*a*) of relays LIMB and LIMA in series. Relay LIMA locks through its right winding, its tongue (*f*), conductor E of cable C–3, conductor E of cable C–3 (FIG. 10) and from conductor E of cable C–4 (FIG. 8) to conductor 83 and armature (*c*) of relay CSAM to ground. Had the tie-line been associated with level B of switch TLIS, in place of level A, relay LIMB would have operated in place of LIMA, in a similar manner.

Thus, it will be noted that operation of the space relay SPC on receipt of the space character caused the cord circuit finder switch to step to a point corresponding to the particular cord circuit in use and this finder switch in turn initiated operation of the tie-line identification switch TLIS to step to a point individual to the tie-line in use. Through these two switches top line information concerning the identity of both the cord circuit and the tie line into which the cord circuit is plugged may be obtained.

*Program switch*

The operation of relay LIMA or LIMB (FIG. 12), completes a circuit to operate the program A connect relay PAC–1 (FIG. 9), this circuit extending from battery through the winding of PAC–1, conductor 91, lead N of cable C–3 (FIG. 10) and thence from the cable (FIG. 12) by conductor N, through the right make contact of relay LIMA or LIMB to conductor T of cable C–3, and from the cable (FIG. 10) and by conductor 100, back contact and tongue (*b*) of relay PAON, and conductor 101, to the normal point, level B of tape tie-up rotary switch TTS (FIG. 8) to ground. Relay PAC–1 operates and locks up, the locking ground extending from conductor 100 (FIG. 10) to conductor **100*a*** and made tongue (*b*) of relay PAC–1 to ground.

The operation of relay PAC–1 connects the tie-line through the contacts of the top line transmitting relay TLR and the winding of the cord circuit line relay LR so that any operation of relay TLR will effect operation of both the patron's printer and the cord circuit printer-perforator.

Starting with the line jack J–1 (FIG. 4) this circuit extends from the tip P, conductor 40, left tongue of relay FDAR, made tongue (*b*) of relay E, conductor 42, contacts (*a*) of relay 8LFC, conductor G of cable C–2 (FIG. 9), selected point of level C of cord finder switch CFS–A (FIG. 8), conductor G of cable C–4 (FIG. 9), made tongue (*e*) of relay PAC–1, tongue (*a*) and back contact of relay PAC–2, the armature and marking contact M of top line transmitting relay TLR, conductor H of cable C–4, level B of cord finder switch CFS–A, conductor H of cable C–2, conductor 84 (FIG. 5) and conductor 50 to the winding of line relay LR.

The operation of PAC–1 also completes the circuit previously traced from ground to tongue (*a*) of the relay and continuing from the made contact thereof, conductor F of cable C–4, the D level wiper of finder switch CFS–A, F conductor of cable C–2, conductor 85 and (FIG. 5) right winding of relay PPCO in the cord circuit, to battery. Relay PPCO operates and locks at its right tongue. At tongue (*a*) it opens a short across conductors G and H of cable C–2 to allow the top line generator to send to the cord circuit. At tongue (*b*) relay PPCO applies ground over lead L of cable C–2 for later use.

The operation of relay PAC–1 also prepares a holding ground at tongue (*d*) and conductor 92 for relay PAC–2, when operated.

The winding of the top line transmitting relay TLR (FIG. 9) is in series with the winding of the top line monitor relay TMR and normally both relays are held on their marking contacts by a circuit extending over contacts (*g*) of relay PAC–1 (when deenergized) to battery at the rest segment R of ring R–3 of the distributor TLDA. With relay PAC–1 operated this connection is opened at contacts (*g*) of the relay but battery is retained on the transmitting relay windings by a circuit extending through tongue (*h*) of relay PAC–1, conductor 93 and the normal contact N, level A (FIG. 10) of program switch PSA and conductor 102 to battery at segment R of the distributor ring R–3.

The solid ring R–1 of distributor TLDA is also connected to the winding of top line relays TLR and TMR by conductor 94, so that when the program switch is stepped off its normal contacts the relays TLR and TMR will repeat the signals set up on the segmented ring R–3.

The stepping circuit for the program switch PSA is also completed by operation of the PAC–1 relay. This circuit extends from the probe segment PS of ring R–4 of distributor TLDA, which segment is grounded once each revolution through ring R–2, thence through tongue (*f*) of relay PAC–1, and by way of conductor 95 to the wiper of level B of the program switch PSA, the strapped contacts thereof and conductor 103 to the stepping magnet SM–3, so that this switch steps once for each revolution of the distributor TLDA.

At the start of the connections, as PAC–1 operates, the wiper of the program switch is on its normal (26th) point. The brushes of distributor TLDA are constantly rotating and the first passage of distributor brush B–2 over probe segment PS, steps the program switch to its 1st point (1) removing battery, at level A of the switch, from the transmitting relays TLR and TMR, and completing a circuit from positive battery at the wiper, level E, of the program switch, and point 1 thereof to one conductor (D in the example given) of the matrix cable C–5, to set up the first top line character in the matrix code generator (FIG. 11) later to be described. For Detroit the first five characters transmitted are "DE (space)DE" and the first five studs of the E level are wired to the corresponding inputs of the matrix.

*Selection of part 2 of top line generator*

Figure 14:
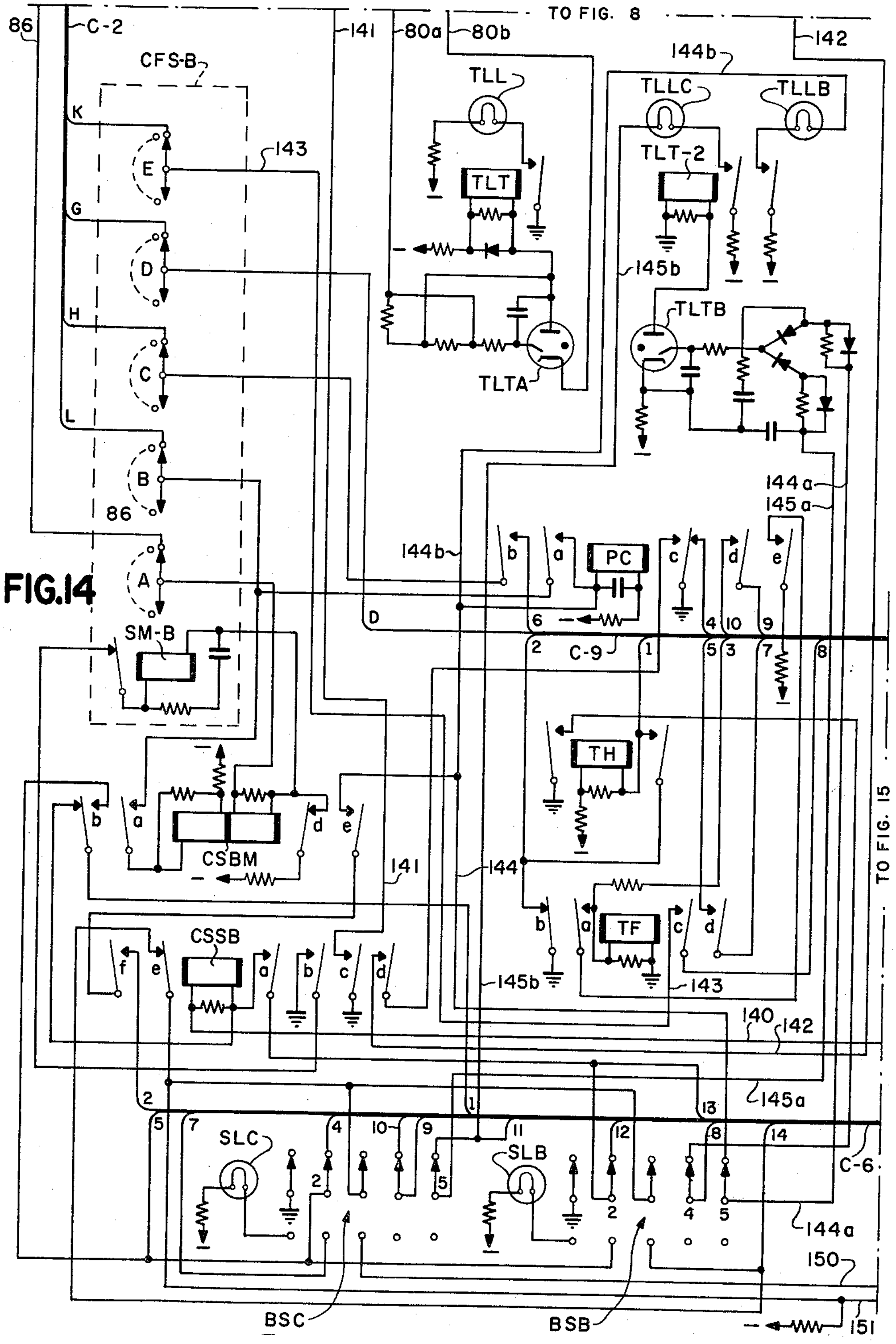

At the time switch PSA steps off its normal points relay PAON operates by closure of the off-normal contacts ON of the program switch. Relay PAON at tongue (*a*) applies ground by conductor 104 and conductor 13 of cable C–6 (FIG. 16) to tongue (*a*) of relay CSSB (FIG. 14). This ground also extends to arm 2 of the busy switch BSB, thence by conductor 12 of cable C–6 and (FIG. 16) off-normal tongue (*a*) of program switch PSB, conductor 160 (FIG.17), wiper B of time and date program switch TDP–B, its normal point, conductor 1 of cable C–6, thence (FIG. 14) to tongue (*b*) of relay CSBM to winding of relay CSSB (FIG. 15), conductor 140, winding of relay POGB, conductor 150 to tongue of relay CSSC and conductor 151 (FIG. 14) to battery. This constitutes an answer-next circuit so that if the B second section is not in the normal or idle condition, the circuit is connected to the busy switch BSC (FIG. 14) and to a similar circuit in the second unit of the second half of the top line generator, later to be described. Relays CSSB and POGB operate in series and CSSB locks up over the tongue (*a*) to which ground was applied at relay PAON, as described. Relay CSSB at tongue (*e*) opens the corresponding circuit to relays CSSC and POGC of the second or C unit of the second half of the top line generator.

Relay CSSB closes tongue (*b*), applying ground to the stepping magnet SM–B of the cord finder switch CFS–B, associated with unit B of section two of the top line generator to start the same step, and at tongue (*c*) it applies ground over conductor 141 to wiper G of switch CFS–A (FIG. 8), its selected point and conductor 86 to the corresponding point of level A of finder switch CFS–B (FIG. 14), the wiper of which extends to the right winding of mark relay CSBM. When CFS–B reaches its selected point, the stepping battery is shorted and mark relay CSBM operates to stop the stepping operation.

Relay POGB (FIG. 15) which operated in series with CSSB completes a circuit from ground at tongue (*e*) of the operated tie-line identification relay, as LIMA (FIG. 12), wiper E of switch TLIS, one of the conductors 1, 2, to X of cable C–7, depending on the operated position of the switch, and by way of cable C–7 to the contacts of relay POGB (FIG. 15), thence by one of the conductors 1, 2, to X of cable C–8, to the winding of one of the relays PO–1 and PO–2 to PO–X (FIG. 16) and to battery. There is one relay PO–1 to PO–X for each city of origin of the message, selected as indicated by the above circuit, from the setting of the tie-line identification switch. In the example being traced herein, this is assumed to be Detroit, Michigan, and under this assumption relay PO–1 will be operated and locked through its tongue (*a*) to conductor 2 of cable C–9 and (FIG. 14) tongue (*b*) of relay TF, to ground.

Figure 11:
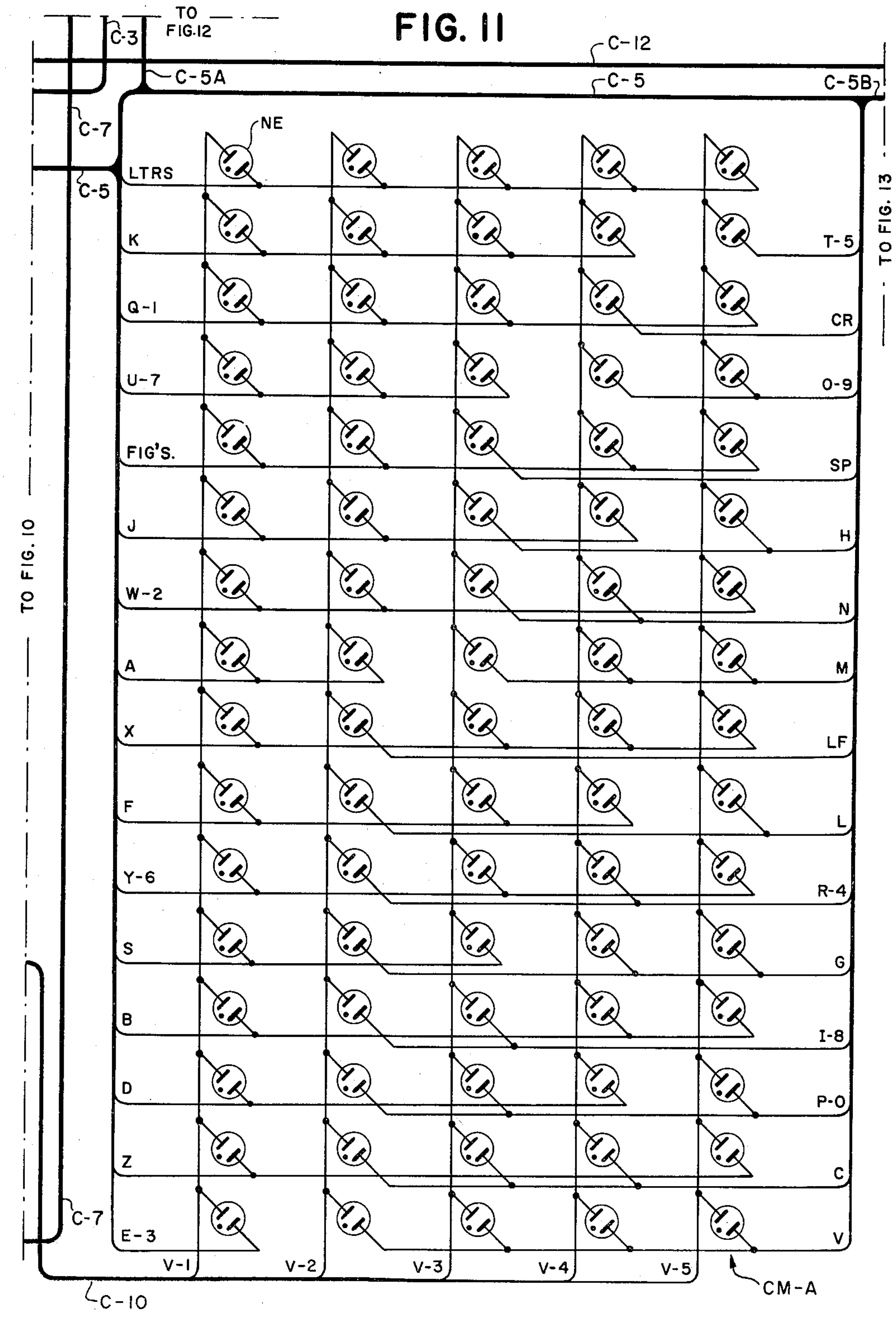
Figure 12:
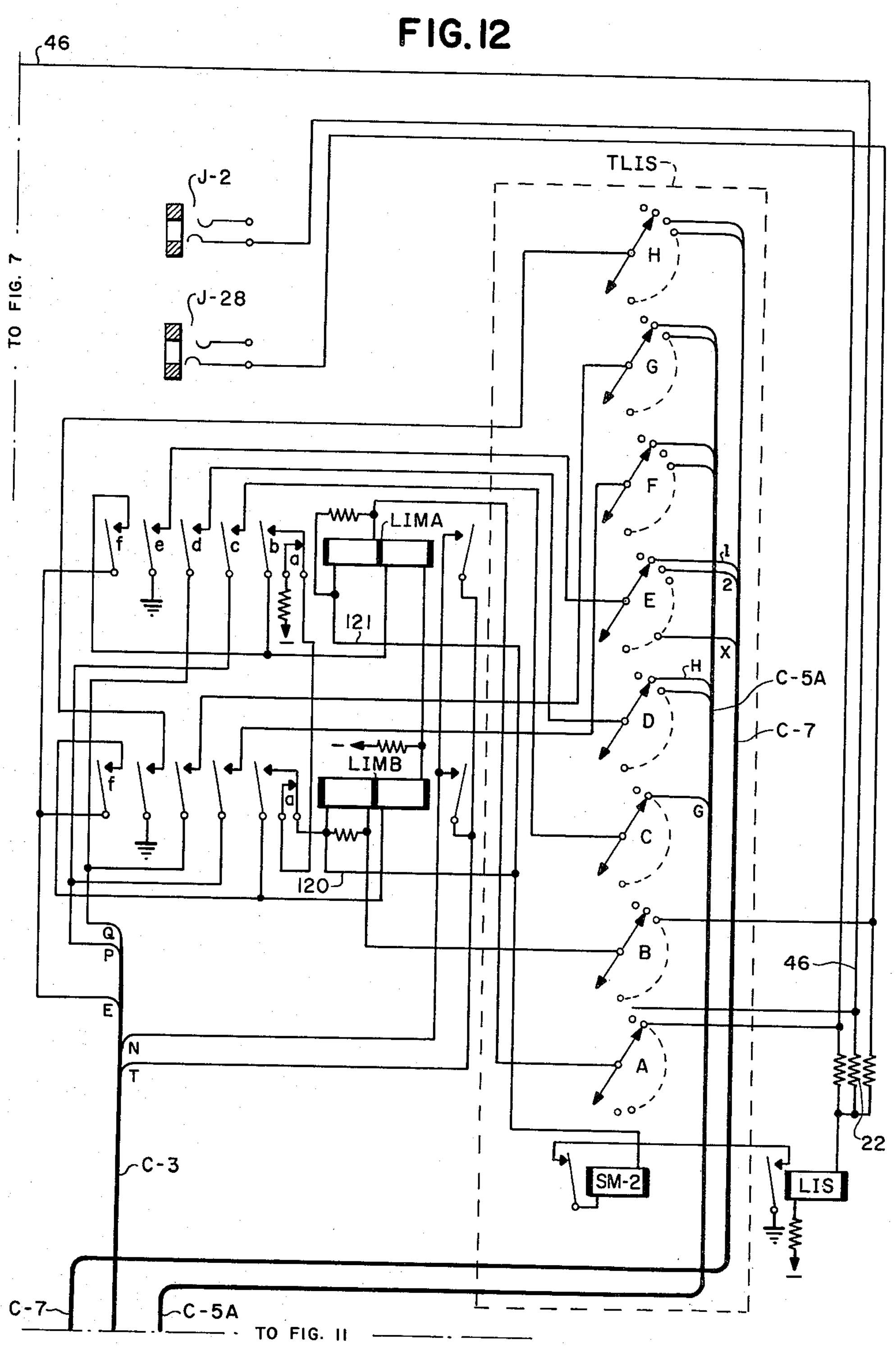

The operation of cord finder switch CFS–B, relays CSBM, CSSB, POGB and PO–1 take place in a fraction of a second after operation of relay PAON, during which time program switch PSA continues to step to set-up in turn the first five characters of the top line information, namely "DE(space)DE" through the matrix code generator of FIG. 11.

*Matrix code generator*

Referring now to FIG. 11 a matrix is shown for generating permutation code signals from points on a single level of a number of rotary switches employed in the system, as for instance, the program switches, cord finder switch CFS–A, the tie-line identification switch TLIS, the automatic numbering machine switches and the time and date switches. This matrix consists of 31 horizontal conductors, one for each letter of the alphabet, and each of the printer functions, letters shift, figures shift, carriage return, line feed and letters space, these horizontal conductors being so marked. Certain of these horizontal conductors serve in generating the numerical codes 0 to 9, as indicated. A group of 5 vertical code conductors V–1 to V–5, corresponding to each of the pulses of the five-unit code, are provided, with gas filled, cold cathode glow discharge tubes (neon lamps) NE connected between the vertical and horizontal conductors in coded arrangement. Thus the top or "Ltrs" code horizontal conductor is connected through the tubes NE to each vertical code conductor V–1 to V–5 in accordance with the letters shift code (pulses 1 to 5 marking), the letter "K" code conductor is connected to code conductors V–1 to V–4 (pulses 1 to 4 marking), the "T" code (also digit 5) conductor is connected to code conductor V–5 (fifth pulse only marking), and so on for each letter and printer function.

Figure 10:
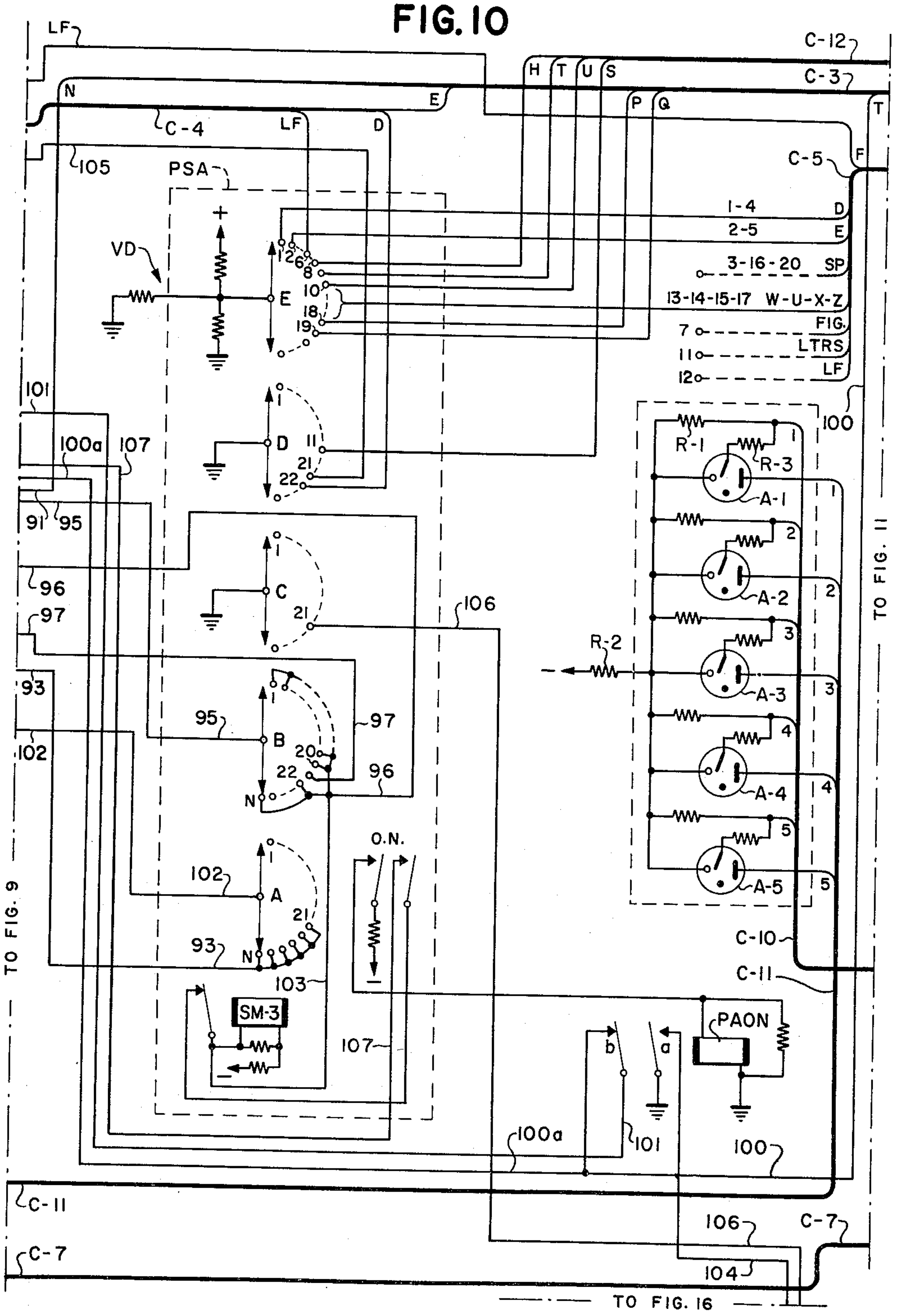

The horizontal or input conductors are combined in cables C–5, C–5A and C–5B extending respectively to the program switch PSA (FIG. 10), the line identification switch TLIS (FIG. 12) and the automatic numbering machine ANM (FIG. 13), all of which may set up predetermined codes through the matrix, as will appear. The vertical or output conductors V–1 to V–5 are combined in cable C–10 and terminate (FIG. 10) at negative battery through individual resistors R–1 and a common resistor R–2. The positive voltage applied to all horizontal or input conductors is derived from the voltage divider VD connected to the wiper of level E of the program switch PSA (FIG. 10).

The lamps NE conduct equally well in either direction but leakage to an unmarked output conductor is prevented by properly choosing the input and output voltages. The neon lamps NE break down and conduct when a potential of 70–75 volts is applied across them. The input conductor must be energized with at least this voltage to obtain any output. The output voltage is the input voltage less the 60-volt lamp drop. Any leakage path to an unmarked output conductor must include at least two lamps in series and the output voltage on the marked output conductor must be at least 140 to 150 volts to break down the lamps in a potential leakage path. Thus by keeping the output voltage below 140 volts no leakage will occur. This permits an input voltage of from 75 to 200 volts to be applied to the input conductor. Thus when any input conductor is energized the neon lamps connected thereto will be energized and remain energized until the potential is removed therefrom.

Each output conductor V–1 to V–5 is connected (FIG. 10) through an individual resistor R–3 to the starting anode of one of the cold cathode, starter anode type amplifying tubes A–1 to A–5, in such manner that a positive potential is produced at the starting anode of each tube when current flows in the associated resistance R–1. The anode cathode circuit of the tubes A–1 to A–5 are connected between negative battery and (by cable C–11) to the segments 1 to 5 of ring R–3 of distributor TLDA, the circuit continuing from solid R–1 and conductor 94 to the winding of transmitting relays TLR and TMR, in series, to ground. Thus when a neon lamp connected to any output conductor in the matrix is operated it conditions the associated tube A–1 to A–5 to operate when the output circuit therethrough is grounded by passage of the distributor brush B–1 over the associated segments 1 to 5 of ring R–3.

*Generation of top line signals (first half)*

Returning now to the operation of the program switch PSA (FIG. 10) it will be recalled that following operation of the PAC–1 relay (FIG. 9), the passage of brush B–2 of distributor TLDA over probe segments PS stepped switch PSA onto its No. 1 point and, at level E, this applied positive battery to conductor D of cable C–5. It will also be recalled that in the example given of a typical top line of information, the first few characters consisted of "DE(space)DEF(Fig)" designating Detroit as the area of origin of the message and the cord circuit in use as the Detroit cord circuit F. The No. 1 point of switch PSA is thus connected to the D conductor of cable C–5 to effect generation of the D code through the matrix. Points 2 to 5 of the E level of the switch are similarly connected respectively to the E (space), D and E conductors of cable C–5.

With conductor D of cable C–5 at the proper positive potential, neon lamps NE connected to vertical output conductor V–1 and V–4 will be energized. As the distributor brush B–1 engages segments 1 and 4 of ring R–3, in the next revolution tube A–1 and A–4 will break down and relays TLR and TMR will be operated to transmit the D character (pulses 1 and 4 marking) over circuits previously traced to both the patron's printer and the cord circuit printer-perforator PR. At the end of this revolution probe pulse PS is again engaged to step the program switch PSA to point 2, to apply potential to the E input conductor of the matrix and generates a code (1st pulse marking) for transmission to the patron and the central office printer perforator. In this way the "DE(space)DE" group of code signals is generated directly from the points of level G of switch PSA and matrix CM–A, and transmitted over the distributor. The next code of the example, namely "F," is a variable signals depending depending on the particular cord circuit in use, as represented by the position of the cord circuit finder switch CFS–A. Consequently when the program switch PSA steps to its 6th point, battery at level E thereof is applied over conductor LF of cable C–4, and (FIG. 8), through the selected point, level F of the cord circuit finder switch CFS–A, conductor LF of cable C–2, and back (FIG. 10) to conductor F of cable C–5, to thus generate the F character code. It will be understood of course that each point of level F of the line finder switch is connected to a different conductor of cable C–5 to generate a different cord circuit letter designation. Following the transmission of the cord circuit designation, switch PSA steps to point 7 to mark the "Fig" conductor of cable C–5 for generation and transmission of the figures shift code.

*Transmission from automatic numbering machine*

Figure 13:
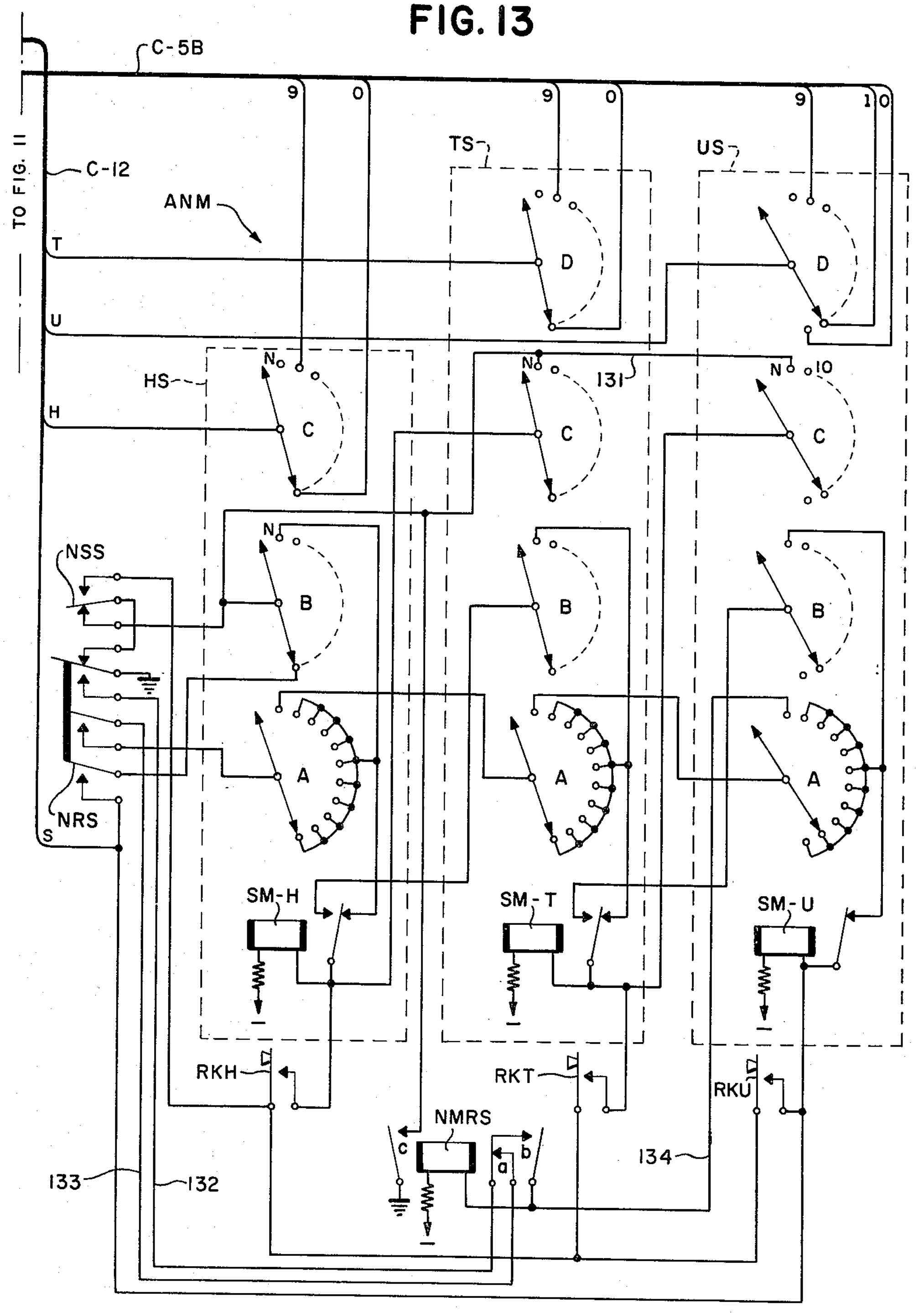

Switch PSA next steps to points 8, 9 and 10, in succession, for generation of the message number, thereby marking conductors H, T and U of cables C–12, the latter cable extending to the automatic numbering machine shown in FIG. 13. The numbering machine comprises a three-level hundreds digit switch HS, a four-level tens digit switch TS and a four-level units digit switch US. The numbering machine is of a type in common use in reperforator switching systems except that in the present application it has been simplified to the extent that it requires but one level of each of the switches to generate, through the matrix, the proper digit code in place of the five levels heretofore required for setting up such codes. A detailed description of the numbering machine will be given hereinafter, but for the present the description will be limited to tracing the circuits, through the top level of each switch for marking the matrix to generate the hundreds, tens and units digit of the instant message number.

Again assuming the program switch PSA to have stepped onto points 8, 9, 10 to energize conductors H, T and U of cable C–12 (FIG. 13) in succession, in the position of the switches shown, the circuit over the H conductor is completed through the hundreds digit switch HS, level C wiper, point 1 (zero digit), conductor 0 of cable C–5B, the P–0 horizontal conductor of the matrix, the neon lamps and vertical conductors V–2, V–3 and V–5, to set up the zero code. Likewise the circuit from the tens conductor T is completed through point 1, level D of the tens digit switch TS to repeat the zero code, and the circuit for the units conductor U is completed through point 2, level D of the units digit switch US to conductor 1 of cable C–5B, horizontal conductor Q–1 of the matrix and vertical output conductors V–1, V–2, V–3 and V–5 to set up the digit 1 code. This constitutes the "001" number of the top line information example given. As the program switch steps to point 11 ground at level D is applied over conductor S of cable C–12 and (FIG. 13) to the step magnet SM–U of the units switch to step it to point 2, thus setting up the next number "002" on the numbering machine.

The next portion of the top line information representing the calling tie-line, namely "(Letters)(Linefeed) WUX(Space)ZGH(Space)" is initiated from points 11 to 20 of the E level of the program switch PSA. Points 11 to 17 set up the "letters, linefeed, WUX space and Z" codes, since these are fixed characters, by directly marking the LTRS, LF, W, U, X, Sp, Z horizontal conductors of the matrix in succession. When switch PSA reaches point 18 a matrix marking circuit is completed over conductor P of cable C–3, and (FIG. 12) made armature (*c*) of relay LIMA, level C of switch TLIS and conductor G of cable C–5A, horizontal conductor G of the matrix and vertical conductors V–2, V–4, V–5 to set up the G character or first variable tie-line identification code, of the ZGM designation, on the distributor. The final H code of the tie-line identification group is set up from point 19 of switch PSA, conductor Q of cable C–3, armature (*d*) of relay LIMA and level E of switch TLIS to conductor H of the cable C–5A and thence to the matrix.

Following this is a "space" code marked on the matrix directly from the level E program switch contact 20. This completes the transmission under control of program switch PSA. As switch PSA steps to point 21 the stepping magnet circuit is interrupted at level B and the distributor is shorted at level A, conductors 93, 102 and tongue (*h*) of relay PAC–1.

*Tape tie-up alarm*

During the foregoing operation of the program switch 20 characters are generated and transmitted both to the patron's line and to the central office printer-perforator PR (FIG. 5). The printer-perforator is provided with a roller TR in contact with the tape for the operation of a circuit interrupter CIC which periodically applies ground to conductor 55 whenever tape is moving through the perforator. Conductor 55 is continued by conductor C of cable C–2 (FIG. 8) to the J-level wiper of switch CFS–A and left tongue of relay TTP–2 to the winding of relay TTP–1, and operated tongue (*e*) of relay CSAM, to battery, so as to operate relay TTP–1 upon the first closure of the circuit interrupter contacts CIC following operation of the mark relay CSAM. Relay TTP–1 prepares a circuit for TTP–2 so that, as the CIC contacts open, current from TTP–1 flows through TTP–2 and the tongue of the stepping magnet SM–4 of the tape tie-up switch TTS to ground. Relay TTP–2 operates and completes a circuit at its right tongue to the step magnet SM–4, to step the switch TTS. Magnet SM–4 on operation opens its armature to release TTP–1 and TTP–2. Each succeeding operation of the CIC contacts steps the switch TTS in like manner at a rate of about one step for each two characters advanced through the perforator, until switch TTS reaches its 8th point at which position it rests by the grounding out of the stepping battery at its level B.

Figure 8:
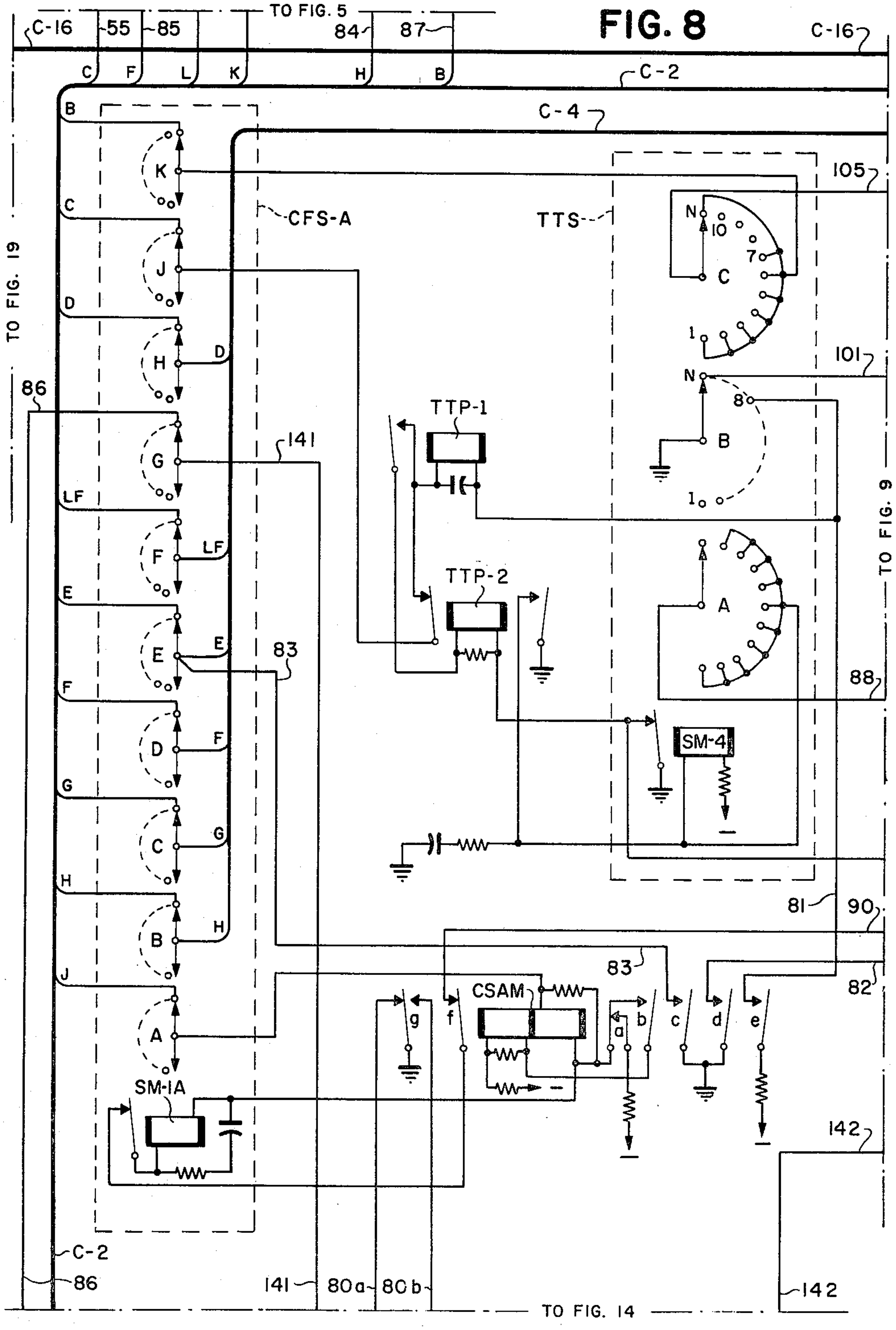
Figure 9:
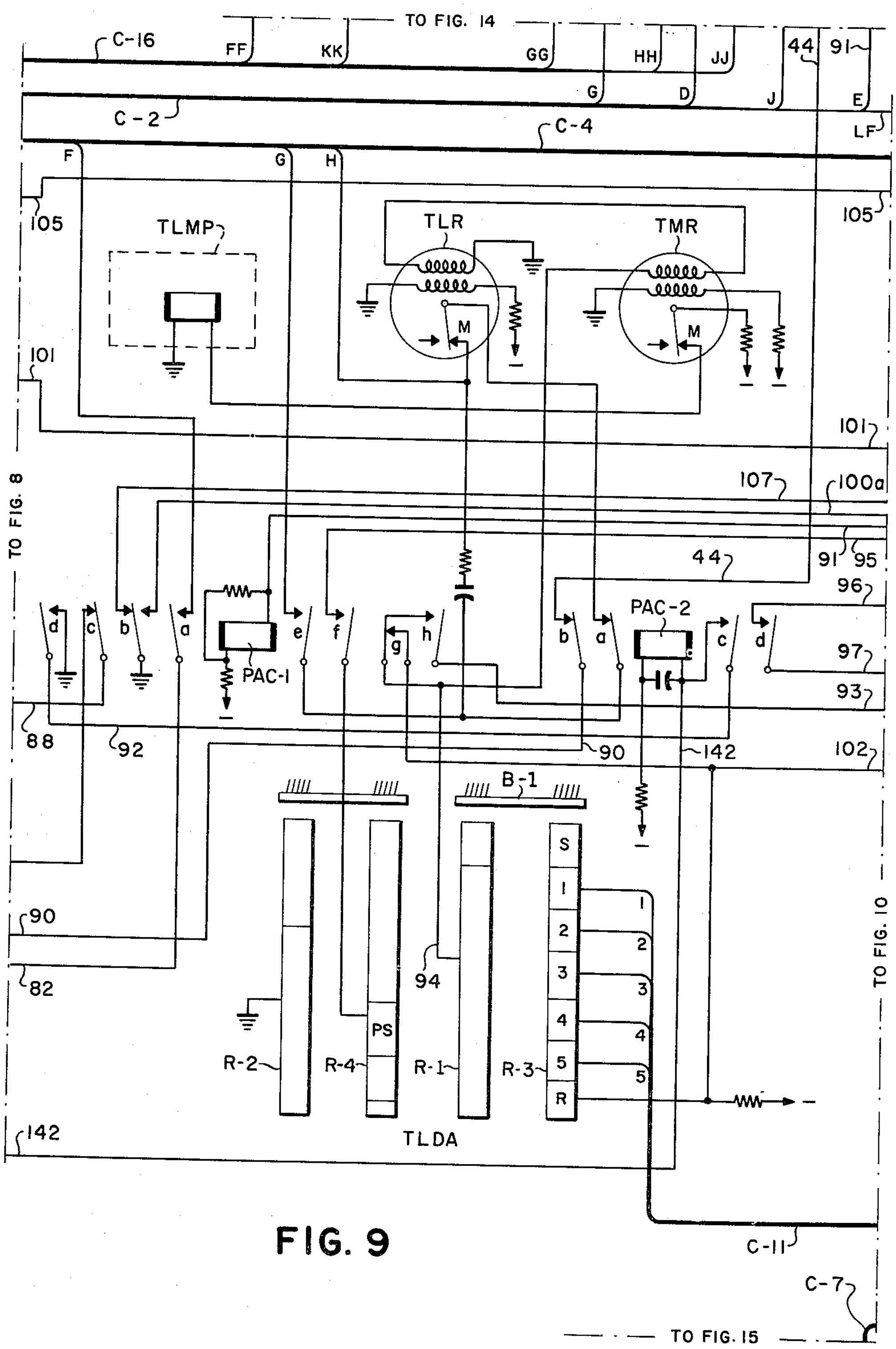

The above operation of the tape tie-up switch TTS occurs during the operation of the program switch PSA (FIG. 10) and when the latter completes its transmission cycle and steps to its 21st point, ground is applied at level D thereof over conductor 105 to the wiper, level C, of switch TTS (FIG. 8). If this switch has not reached its 8th point, the ground goes out over the K-level wiper of finder switch CFS–A, conductor B of cable C–2 and conductor 87 to operate tape tie-up alarm relay TTA (FIG. 5) in the cord circuit, which at its tongues (*b*) and (*a*) brings up the tape tie-up alarm TTL and supervisory lamp SUL, respectively, and at its tongue (*c*) opens a circuit extending to the carriage return contacts CR of the printer-perforator to prevent operation of the CR relays of FIG. 7. At least 16 characters must be in the printer-perforator tape to bring the tape tie-up counter switch TTS to its 8th position and this is taken as evidence of tape motion and satisfactory performance of the printer-perforator.

With program switch PSA (FIG. 10) still on its 21st point, a ground is applied to level C over conductor 106 and (FIG. 16) conductor 2 of cable C–6, tongue (*f*) of relay CSSB (FIG. 14), tongue (*e*) of relay CSBM to the winding of relay PC, which now operates and locks through its tongue (*a*) and level B of finder switch CFS–B, in the same manner as relay CSBM.

*Top line trouble signal*

With relays CSBM, CSSB and PC operated to initiate the second half of the top line generator, the ground at level B of the finder switch CFS–B is extended through tongue (*a*) of relay PC, conductor 144, arm 5 of the busy switch BSB and conductor **144*a* to the starting anode of the top line trouble timer tube TLTB, of the second section of the top line generator, so as to fire tube TLTB if the top line information is not completed and relay PC released within a prescribed time, say five seconds, to thereby operate relay TLT–2 and apply battery to the trouble lamps TLLB and TLLC, associated with the B and C units, respectively, of the second section of the top line generator. Since the B unit is assumed to be in use lamp TLLB will operate to ground over conductor 144*b***, tongue (*a*) of relay PC and level B of switch CFS–B.

A similar circuit for the duplicate C unit of the second section of the top line generator extends from the B level of finder switch CFS–C (FIG. 15), tongue of relay PC–C, conductor 11 of cable C–6, arm 5 of busy switch BSC and conductor **145*a* to the starting anode of timer tube TLTB, the ground for lamp TLLC being supplied by conductor 145*b* connected between the lamp and conductor 11** of cable C–6.

*Top line transmission circuit (second half)*

Relay PC in addition to initiating the operation of time tube TLTB, at tongue (*b*) closes a circuit from the tongue of transmitting relay TLRB (FIG. 15) conductor 6 of cable C–9 and (FIG. 14) made tongue (*b*) of relay PC, level C of switch CFSB, conductor H of cable C–2, and from the cable (FIG. 8) over conductor 84, and (FIG. 5) by conductor 50 to the winding of the line relay LR. The circuit is completed from the marking contact M of relay TLRB (FIG. 15) over conductor D of cable C–9, level D of switch CFSB (FIG. 14) and from lead G of cable C–2 (FIG. 9), over conductor 47 and previously traced contacts of relays 8LFC and E (FIG. 4) of the cord circuit to the line jack J–1 and the tie-line extending to the patron's office.

*Release of top line generator (first half)*

In addition to the above circuit, relay PC at armature (*e*) prepares a circuit from battery to tongue (*a*) of relay TF; and at tongue (*d*) completes a circuit from probe segment PS of distributor TLDB (FIG. 15), conductor 9 of cable C–9, made tongue (*d*) of relay PC, conductor 10 of cable C–9 and (FIG. 17) wiper, level A of time and date switch TDP–B, normal contact N thereof and conductor 170 to the (FIG. 16) stepping magnet SM–5 of the program switch PSB. At tongue (*c*) relay PC applies ground through tongue (*d*) of relay CSSB, and conductor 142 to the winding of relay PAC–2 (FIG. 9) which operates and locks at tongue (*c*) and conductor 92 to made tongue (*d*) of relay PAC–1.

Relay PAC–2 at tongue (*b*) opens a circuit including conductor 90, tongue (*f*) of relay CSAM (FIG. 8) and winding of stepping magnet SM–1A and right winding of relay CSAM to the A level of finder switch CFS–A. At tongue (*a*) relay PAC–2 opens the signaling circuit through the contacts of the top line relay TLR so that this relay is removed from the line signaling circuit. Relay PAC–2 at tongue (*d*) closes a circuit over conductors 96, 97, interconnecting points 21, 22 of level B of the program switch PSA to thus reapply stepping pulses to the step magnet SM–3 thereof. At point 22, level D, the switch PSA grounds conductor D of cable C–4 and through level H of switch CFS–A (FIG. 8) this ground is extended over conductor D of cable C–2, thence by conductor 9 of cable C–1 (FIG. 4) to the cord circuit and (FIG. 7) tongue (*c*) of the space relay SPC, its left winding and winding of relay UR to battery. Relay UR operates and locks at tongue (*a*) to ground, previously traced on conductor 70. At tongue (*b*) relay UR opens the holding circuit for the right winding of relay SPC. Relay SPC remains operated for the duration of the ground applied by conductor 9 of cable C–4 but releases when the program switch PSA leaves its 22nd point. Release of SPC removes ground at tongue (*b*) from conductor 7 of cable C–1 which, over circuits previously traced, releases mark relay CSAM (FIG. 8).

Release of mark relay CSAM (1) closes its tongue (*f*) to remake the circuit, at this point, to stepping magnet SM–1A; (2) closes contact (*a*) to reapply battery to the A wiper of switch CFS–A; and (3) opens tongue (*b*) thereby making the finder switch circuits available to answer a call from another cord circuit. At tongue (*g*) relay CSAM disables the top line trouble timer TLTA (FIG. 14) and at tongue (*c*) removes ground through the ring of the line jack to the tie-line identification switch, which thereupon releases relays LIS (FIG. 12) and LIMA or LIMB, whichever is operated, leaving the identification switch available for another call. Relay CSAM also opens its tongue (*e*) to remove battery from the TTP–1, TTP–2 relays, so that they will no longer respond to movement of the tape in the printer-perforator. At its tongue (*d*) relay CSAM removes ground from the circuit including the winding of relay PPCO (FIG. 5) in the cord circuit, which releases.

Referring again to FIG. 12, the release of relay LIMA or LIMB opens the right tongue of the relay to interrupt the circuit including conductors N, T of cable C–3, which it will be recalled, held relay PAC–1 (FIG. 9) operated. PAC–1 thus releases and (1) at tongue (*c*) closes a circuit over conductor 88 through the A level of tape tie-up switch TTS to home the same; (2) at tongue (*b*) closes a circuit over conductor 107, the off normal contacts of the program switch PSA (FIG. 10) and step magnet SM–3, to self-step this switch to home position and (3) at its tongue (*d*) removes ground from conductor 92, to unlock relay PAC–2.

Release of PAC–2 causes its tongue (*b*) to close the circuit including the cord circuit finder switch step magnet SM–1A and armature (*a*) of the space relay SPC (FIG. 7) whereby to condition the top line generator to respond to another call, upon reoperation of the space relay.

The homing of the program switch PSA, by opening of the off-normal contacts thereof, releases relay PAON which in turn releases relay CSSB (FIG. 14).

*Program switch (second half)*

Figure 15:
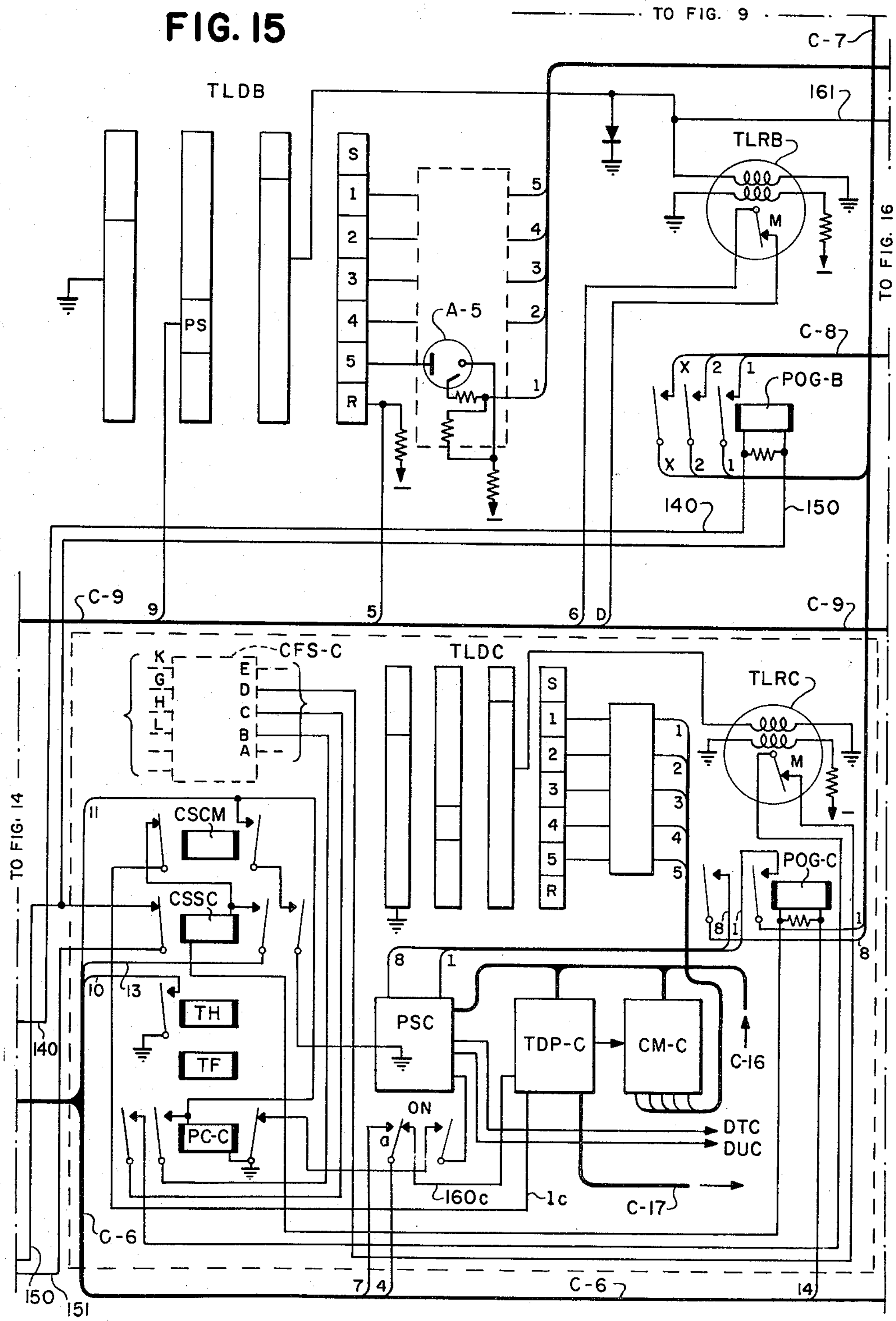
Figure 16:
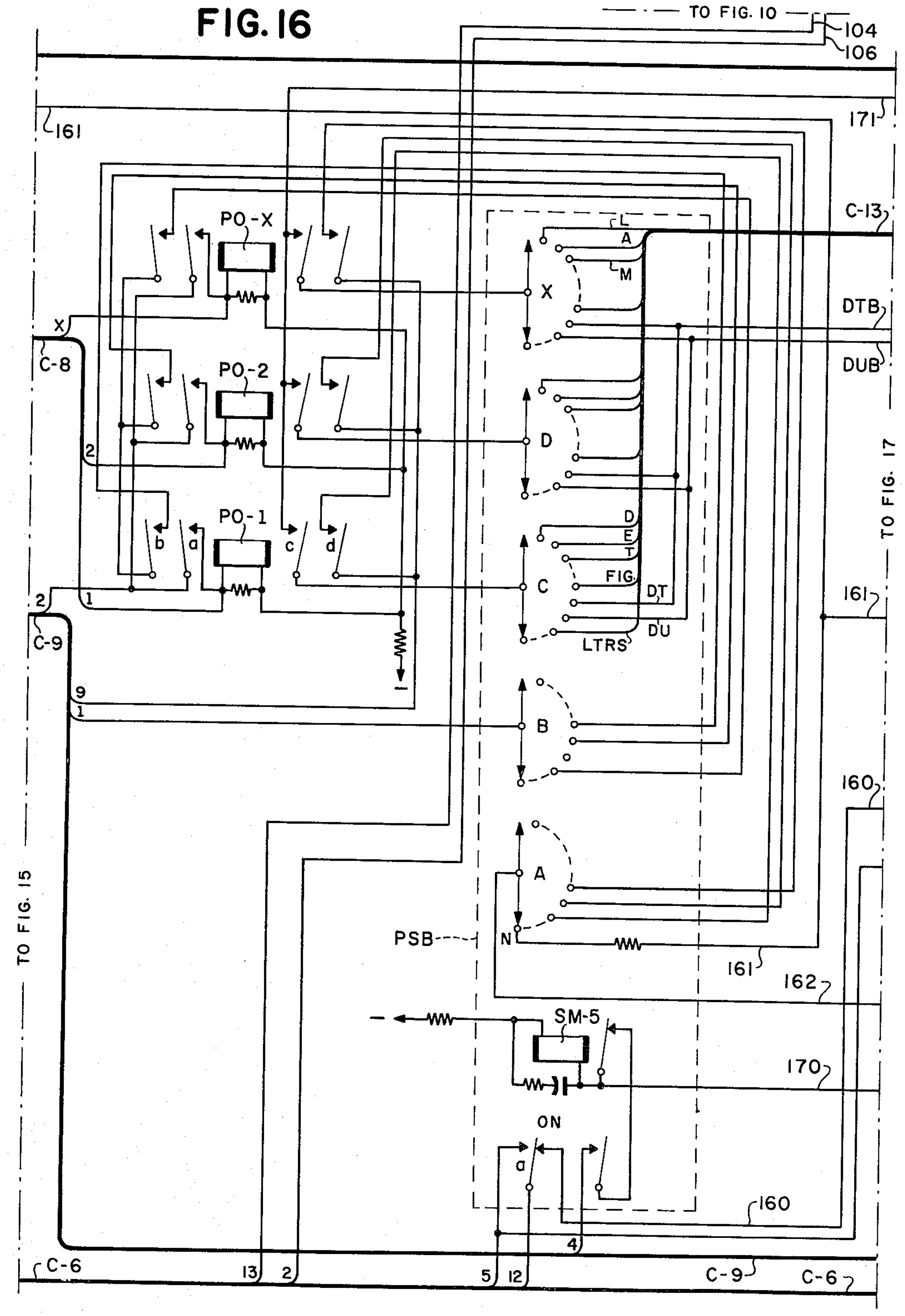

It will be recalled that the above operations, which effect release of the first part of the top line generator immediately followed the operation of relay PC and that this relay completed a circuit for stepping pulses from the second distributor TLDB, through the time and date program switch TDPB. Referring now to FIG. 16 the first step of switch PSB opens a circuit on a level A from negative battery through the step magnet SM–6 (FIG. 17) of the time and date program switch TDPB to the A level wiper and normal stud of program switch PSB and resistor R–6, conductor 161 and the coil of relay TLRB (FIG. 15), which circuit was previously effective to provide a short on the distributor TLDB.

From one of the C, D to X levels of the rotary switch PSB (FIG. 16) previously selected, as described by operation of one of the relays PO–1, PO–2 to PO–X, signals are applied to a second alphabet code matrix CM–B (FIG. 17) identical to that of FIG. 11, to spell out the name of the city of origin of the message. In the example it was assumed that relay PO–1, representing Detroit, Michigan, was operated. Consequently, level C of switch PSB is effective for the above operation. Actuation of relay PO–1 at its tongue (*b*) applies ground to one point of the B level of switch PSB which will be reached when transmission of the city is completed. The studs of the C level, preceding this point, are connected by conductors D, E, T, etc. of cable C–13 to the D, E, T, R, O, I, T (Space), M, I, C, H, (Space), (Fig.), horizontal input conductors of the matrix CM–B. The points of other levels D to X of switch PSB will be connected to the matrix to spell out other cities where messages may originate, as Lansing, Mich. As switch PSB steps over its points the letter codes are set up by the matrix on the tubes such as A–5 (FIG. 15) to supply the code characters to the distributor TLDB, from which the code is effective to operate relay TLRB and to be repeated thereby over the tie-line and to the central office printer-perforator.

*Transmission from time and date switches*

Following the Figures shift code the program switch PSB steps to its next two points to send out the date tens digit and units digit. These points are connected respectively by conductors DTB and DUB to the D level wiper of days tens switch DTS and the E level wiper of the days units switch DUS. The points of level D of the DTS switch are connected in groups of three corresponding to the days tens digits 1, 2 and 3, by cable C–15 to the 1, 2, 3 number code input conductors of the matrix, and the ten points of the day units switch, level E are connected by conductors of cable C–15 to the 0, 1 to 9 character input conductors of the matrix. Therefore, as the program switch contacts its DT, DU points, a tens digit 1 to 3, if any, and a units digit 0 to 9 will be transmitted, depending on the position of rotation of the wipers of switches DTS and DUS. A complete description of the construction of the switches DTS and DUS and the manner in which the wipers are stepped to their proper date position will be given subsequently. When the grounded point of level B of switch PSB is reached, following transmission of the city of origin, a circuit is completed through the B level wiper, conductor 1 of cable C–9 and (FIG. 14) to the winding of relay TH, to operate the same. Relay TH holds through its right tongue, and tongue (*b*) of relay TF, and applies ground [illegible] tongue, arm 4 of busy switch BSB, conductor 8 of cable C–6, which extends through to FIG. 18, to prevent the time and date generator from shifting to a new time during read out, as will later appear.

When the program switch reaches the last point of its program, namely, the point corresponding to the days unit digit, the number of points being different for cities of differing numbers of letters, a circuit is completed from the PS segment of the distributor TLDB, conductor 9 of cable C–9 and (FIG. 16) tongue (*d*) of relay PO–1, the stopped point, level A of switch PSB, wiper A and conductor 162 to step magnet SM–6 of the time and date program switch TDP–B, so that the next stepping pulse from segment PS energizes the step magnets of both the program switch PSB and the time and date switch TDP–B. Both switches step, the program switch PSB advancing to an idle point where it rests until the remainder of the top line information has been generated. The time and date switch steps to its first point or first signaling position where, at level A, it opens circuit 170 to remove further stepping pulses from program switch PSB and connect them solid to step magnet SM–6 of the time and date program switch.

The time and date switch now sends from its E level, point 1 which is connected by the SP conductor of cable C–13 to the "space" input conductor of matrix CM–B to generate the space code. As switch TDP–B continues to step over points 2 to 5 circuits are completed at level E over conductors HT, HU, and cable C–14 to the levels G and H, respectively of the hours switch HS and over conductors MT and MU, to level D of the minutes tens switch MTS and minutes unit switch MUS (FIG. 18) so that as switch TDP–B steps, battery at the wiper of its level E is extending successively to levels G and H of switch HS and level D of switches MTS and MUS. At level G of switch HS this circuit either ends on an idle point (hours 1 through 9) or on a point connected by conductor 1 of cable C–15 (hours 10, 11 or 12) to set up the hours tens digit 1 code through the matrix CM–B. At level H of switch HS and at levels D of switches MTS and MUS, the circuit from the wiper is completed through one of the conductors 1 to 10 to set up the hours unit digit, the minutes tens digit and the minutes unit digit, through the matrix.

When the program switch TDP–B engages its 6th point battery on the level E wiper is extended by conductor LTR of cable C–13 direct to the input of the matrix CM–B to generate a letters shift code. This is followed at points 7 and 8 by the meridian signal AM or PM. The first letter A or P is produced over conductor MR of cable C–14, the level F wiper of switch HS and either conductor A or P of cable C–15 to set up the first letter of the meridian. The second letter M of the meridian is set up directly on the matrix over point 8 of level E of switch TDP–B and conductor M of cable C–13. This is followed at point 9 by a character representing the time zone, as "E" for Eastern standard time, over conductor E of cable C–13. Finally at point 10 switch TDP–B sets up a space code over the SP conductor of cable C–13.

*Release of top line generator (second half)*

During the above cycle, as switch TDP–B engaged its 8th point, a circuit was completed from battery at level D thereof, point 8, conductor 3 of cable C–9 and (FIG. 14) the winding of relay TF, which locks up through its tongue (*a*) and made tongue (*e*) of relay PC. At tongue (*b*) relay TF unlocks relays TH and PO–1 (FIG. 16). Relay TF also prepares a circuit for shorting the segments of distributor TLDB, from the rest segment thereof, conductor 5 of cable C–9, tongue (*d*) of relay TF (FIG. 14), conductor 7 of cable C–9 and wiper C of switch TDP–B (FIG. 17) this circuit being completed, when the switch reaches its home position, over normal point N and conductors 171, 161 to the winding of transmitting relay TLRB (FIG. 15). Also, in the home position of TDP–B, battery at level D wiper is extended over conductor 8 of cable C–9, tongue (c) of relay TF (FIG. 14), conductor 143, level E of finder switch CFSB, conductor K of cable C–2, and (FIG. 5) to the left or bucking winding of relay PPCO and tongue (c) to ground. This opens the locking tongue (c) and completely deenergizes the relay.

Release of PPCO at its tongue (b) removes ground from lead of cable C–2 and level B of switch CFSB (FIG. 14) and the wiper thereof to the left winding of the mark relay CSBM and to the winding of relay PC. The release of relay PC, (1) opens the signal circuit at its tongue (b); (2) opens the step pulse circuit at tongue (d); (3) opens a holding battery circuit at tongue (e) to release relay TF; and (4) through its tongue (c) applies ground to the armature spring contacts and step magnet of SM–3 of switch PSB to self step the switch home, thus restoring all circuits in the B unit of the second part of the top line generator in readiness to handle another call. Release of relay PPCO at its tongue (a) reapplies the short between the conductors G and H of cable C–2, thus shorting out the top line generator from the signalling circuit, including line relay LR.

*Duplicate second half top line generator*

After program switch PSA (FIG. 10) had finished with the first half of a top line and switched the cord circuit to unit B of the second half for completion of the top line, it was free to pick up another call in the same manner and proceed with the transmission of the first half of the top line for this second call. Since the first half of the top line is 20 characters in length while the second half will usually be 24 characters or more depending on the length of the name of the city of origin of the message, program switch PSA may be ready to transfer the second call before program switch PSB is through with the first. For this reason an additional or duplicate second section is provided consisting (FIG. 15) of a cord circuit finder switch CFSC, program switch PSC and associated relays such as PC–C, CSS–C, CSCM, TH and TF, a time and date program switch TDP–C, a code generating matrix CM–C, a distributor TLD–C, a transmitting relay TLRC and relay POG–C, all duplicates of the corresponding elements of the B unit. As will later appear, the time and date switches are common to both units of the second section of the top line generator.

It will be recalled that at the time the first section of the line generator started in operation, relay PAON (FIG. 10) operated to request a second section. If PAON finds section B busy, the request is passed by the answer next circuit to the C section where it is handled in the same manner as described above for the B section. Thus, if section B is busy, with tongue (a) of off-normal switch ON of program switch PSB (FIG. 16) in its off-normal or left position, the ground at tongue (a) of relay PAON (FIG. 10) is extended over conductor 104 to conductor 13 of cable C–6, thence (FIG. 14) to tongue 2 of busy switch BSB, conductor 12 of cable C–6, tongue (a) and left contact of off normal contacts ON of switch PSB (FIG. 16) conductor 5 of cable C–6 and (FIG. 14) tongue 2 of busy switch BSC, thence by lead 4 of cable C–6, the tongue (a) of off normal contacts ON of switch PSC (FIG. 15) to its right or idle condition contact and thence to the conductor 160c, corresponding to conductor 160 of FIGS. 16, 17, through level B of switch TDPC and its normal contact, conductor 1C (corresponding to conductor 1 of cable C–6 for unit B) tongue of relay CSCM to winding of relay CSSC and POG–C, in series and conductor 14 of cable C–6, tongue (e) of relay CSSB to battery. Operation of CSSC and POG–C selects the C unit of the second section for operation. Either unit B or C may be busied by operating the busy switch BSB or BSC to its lower or busy position. Such operation of BSB opens the answer-next circuit, at arms 2 of the switch, over conductor 12 of cable C–6 to the off-normal contacts of program switch PSB and completes it over arm 2 of switch BSC and of cable C–6 to the off-normal contacts of program switch PSC. The reverse is true when busy switch BSC is operated to its busy position. If neither units B or C is available when the first half of the top line generator completes its cycle, this first section will wait to release until a second section is available. Operation of either busy switch BSB or BSC to its busy position lights a signal lamp SLB or SLC.

*Message transmission and end of message disconnect signal*

It will be recalled that at the end of the generation and transmission of the second part of the top line information relay PPCO operated to disconnect the top line generator and complete the signaling circuit directly between the tie line and the cord circuit line relay LR. At this time, the patron noting that the top line has been completed and transmission to his printer has stopped, now sends the body of the message which will be received on the cord circuit printer perforator PR.

The message is concluded by an end-of-message disconnect signal consisting of two carriage returns. The first carriage return operates the CR contacts of the printer-perforator and applied ground over conductor 56, tongue (c) of relay TTA and lead 10 of cable C–1, and (FIG. 7) tongue (a) of relay CR–1B, to the winding of relay CR–1A and battery at dump relay DP, to operate CR–1A. Relay CR–1A at its left tongue prepares a circuit through the right coil of relay CR–1B to grounded conductor 70 and at the opening of the CR contacts of the printer-perforator, relay CR–1B operates in series with CR–1A and holds. The next operation of the CR contacts operates relay CR–2A, from lead 10 of cable C–1, made tongue (a) of relay CR–1B, left tongue of relay CR–2B, winding of CR–2A to battery, and upon opening of the CR contacts of the printer-perforator, relay CR–2B operates in series with CR–2A, from battery at CR–2A, its right tongue, winding of CR–2B and lead 11 of cable C–1 to ground at contact (d) of relay E8LF (FIG. 4). In the case of a single carriage return followed by some other character, the operation of the bail contact BL of the printer-perforation applies ground by conductor 51, make tongue (d) of relay B–2 (FIG. 7), made tongue (b) of relay CR–1B to the left coil of CR–1B and winding of dump relay DP, to battery. Operation of relay DP removes battery from relay CR–1A and CR–1B restoring these relays to the unoperated condition. Also it would be noted that if tape tie-up relay TTA had been operated during the operation of the top line generator, relays CR–1B, CR–2B, CR–2A and CR–2B would not have operated so that the top line generator could not be selected until the supervisory operator, in response to signal light TTL (FIG. 5) has operated the tape tie-up clear-out button TTCO to release relay TTA, and has transmitted a double carriage return from her keyboard. However, in the case of the reception of two successive carriage returns, relays CR–2A and CR–2B are operated in succession.

During the operated time of the CR contact of the printer-perforator when CR–2A is operated but CR–2B has not yet operated a circuit is made from ground through left made tongue of CR–2A, back contact and tongue (a) of relay CR–2B, lead 12 of cable C–1, to the add magnet AM (FIG. 6) of the message waiting indicator MWI. This indicator is of the form shown in Blanton U.S. Patent No. 2,575,329, granted November 20, 1951, and for the present purpose it is sufficient to say that operation of magnet AM steps the dial shaft 61 ahead one step to indicate a message waiting for processing through the central office switching system.

*8 line feed generator*

As soon as relay CR–2B operates, upon opening of the carriage return contacts CR, a circuit is made from ground through tongue (*c*) of the relay, lead 13 of cable C–1, which (FIG. 9) becomes leak KK of cable C–16, extending (FIG. 19) through the winding of relay 8LFS, to battery at tongue (*c*) of the 8 line feed mark relay 8LFM. At the same time ground at tongue (*b*) of relay CR–2B is applied over lead 14 of cable C–1, which becomes lead JJ of cable C–16 (FIG. 9) and extends (FIG. 19) to mark one point of the A level of the 8 line feed generator line finder 8LFG. The 8 line feed generator is common to all cord circuits and the grounded point of the switch, level A, is individual to the cord circuit in use.

The operation of relay 8LFS closes a circuit for the step magnet SM–8 of the finder switch, the circuit extending from the grounded normal point level A of 8 line feed program switch 8LFPS, made tongue (*a*) of relay 8LFS, step magnet SM–8, contact (*a*) of mark relay 8LFM and tongue (*b*) of relay 8LFS to battery. The line finder switch self-steps until its A level wiper contacts the marked point, at which time the stepping battery is shorted and relay 8LFM operates and stops the stepping. Relay 8LFM locks to the grounded point of level A of the finder switch.

The operation of relay 8LFM puts battery from its tongue (*e*) on level B of the switch, and on lead GG of cable C–16, which extends (FIG. 4) through the winding of relay 8LFC and contact (*e*) of relay E8LF to ground, thereby to operate relay 8LFC. The operation of relay 8LFC applies ground at tongue (*e*) to conductor JJ to hold the marked point of switch 8LFG grounded and at open contact (*d*) release the relays CR–2A and CR–2B. At contacts (*a*) relay 8LFC disconnects the coil of the line relay LR from the line circuit and at tongue (*b*) substitutes a dummy load resistor DLR to hold the relay on marking. At tongue (*c*) relay 8LFC connects the patron's tie-line to conductor HH, which extends by cable C–16 (FIG. 9) and terminates (FIG. 19) at the C level of finder switch 8LFG, the circuit continuing from the C level wiper to the solid sending ring of distributor 8LFD. The release of relay CR–2B removes ground from lead KK and thus (FIG. 19) releases relay 8LFS, which thereupon at tongue (*c*) disables a timer tube 8LFTT which started to time when relay 8LFS was energized whereby to operate an alarm relay 8LFT and associated alarm lamp LFA, if a connection is not made within a predetermined interval, say five seconds, after a request.

The operation of relay 8LFM at tongue (*d*) connects step pulses from distributor step magnet SS to the program switch step magnet SM–9, which begins to step. As soon as it steps off its normal point, steady battery at level B is removed from level C of switch 8LFG and lead HH extending to the patron's tie-line and connected to distributor segments 2 and R of the segmented ring to thus set up a line feed signal. Level B segments 1 to 8 are strapped so that on each revolution of distributor 8LFD the switch is stepped and a line feed signal sent to the patron's tie-line. At the end of the 8th line feed, as switch 8LFPS steps to point 9 steady battery is again applied by lead HH to the tie-line at level B, and at the same time a ground is applied from level C of 8LFPS, level D of finder switch 8LFG and lead FF of cable C–16 to operate relay E8LF (FIG. 4).

Relay E8LF opens its contact (*e*) to release relay 8LFC, which in turn at tongue (*c*) disconnects the 8 line feed generator lead HH from the tie-line and at contact (*a*) restores the line relay LR (FIG. 5) to the tie-line circuit, and at tongue (*e*) takes ground from the 8 line feed lead JJ which (FIG. 19) releases the mark relay 8LFM. Relay 8LFM thereupon at its tongue (*d*) completes a circuit through level A of program switch 8LFPS to step the same to its normal position in readiness to answer another request.

The release of cord circuit relay 8LFC at tongue (*f*) and conductors 15 and 16 of cable C–1 prepares circuits for later use.

*Disconnect timer.*—Relay E8LF locks through its tongue (*a*) to ground at tongue (*d*) of relay TDCO. At tongue (*b*) it opens the holding circuit for relay B–2 (FIG. 7) restoring the character detection circuit to the unoperated condition; at tongue (*d*) it connects the operate lamp OL to steady ground; and at tongue (*c*), over conductors 2 and 17 of cable C–1, it shorts out the resistor R–7 in the timer circuit (FIG. 6) to change the timing period of tube FCTT from 20 to 10 seconds. The transmission of the message from the patron has now been completed and if a new message is not started within 10 seconds, the time tube FCTT will fire to operate relay TDCO (FIG. 4). Relay TDCO at its tongue (*d*) releases relay E8LF and disconnects the patron, as previously described.

If the patron has more traffic and begins another transmission within the ten second time limit, the first start pulse puts negative battery on the line relay LR (FIG. 5) which is extended over conductor 18 of cable C–1 to the right coil (FIG. 4) of relay E8LF and its contact (*e*) to ground, in the opposite direction to the current in the left coil. This releases relay E8LF and restores all circuits in readiness for the next message. The same spacing pulse over conductor 57 releases relay TFA in the same manner.

*Blank tape feed out*

Assuming no further messages, relay TF–A when operated by relay 8LFC, as described, prepares circuits for the automatic feed out of blank tape when required, in the following manner: Relay TF–A when operated, holds through its left coil, tongue (*e*) and the tape metering contacts TMC of the printer-reperforator PR, and by conductor 58, through the middle contacts of the tape feed-out push button TFO (FIG. 6) to ground. If at any point in the transmission of a message the tape comes up tight, a circuit is then closed from ground through the middle contact of the push button TFO, tight tape lever TTL and conductor 62 to the right winding of relay TF–B (FIG. 5) and tongue (*f*) of relay TF–A to battery. Relay TF–B operates and holds through its tongue (*a*) to ground through the TFO push button. Relay TF–B at tongue (*b*) applies ground from tongue (*d*) of relay TF–A to the tape metering magnet TMM of the printer-perforator and to the printer clutch solenoid PCS, in series, causing tape to be fed out of the printer-perforator. At the same time relay TF–B at tongue (*c*) energizes the punch insert solenoid PIS which withdraws the punches and causes the tape to be blank.

Automatic feed out continues until a predetermined amount of the tape has been fed, at which time the metering contacts TMC open and relay TF–A releases, which in turn releases relay TF–B. Should transmission of another message begin while the tape is being fed, the first spacing pulse causes current to flow through the space contacts of line relay LR (FIG. 5) through the right coil of relay TF–A and its tongue (*d*) to ground. The resulting field bucks that of the current in the left coil and the relay starts to release. As soon as tongue (*d*) opens the relay is completely deenergized and in turn releases relay TF–B, as before.

For manually controlled tape feedout, the operation of the tape feedout push button TF (FIG. 6), at its middle tongue releases relay TF–A, if previously operated, and at its upper tongue connects the cathode of feedout delay tube FOT over conductor 63 to ground through contact (*a*) of relay TF–A. After about 50 milliseconds the tube conducts and operates relay TF–B over conductors 63 and 64 and tongue (*a*) of relay TF–A, to ground. Relay TF–B causes blank tape to be fed out as before, except that the amount fed out is not controlled by the metering contacts. The purpose of the delay introduced by gas tube FOT is to insure that feedout will not interfere with the punching of a character whose transmission has started. Should transmission start after tape feedout has started, the first spacing impulse will operate relay TF–A from the space contact S of relay LR, through the right coil, conductor 65 and the middle tongue and lower contact of the TFO push button, to ground, opening the cathode circuit to tube FOT at its contact (*a*) and discharging the condenser FOC in the starter anode circuit, at tongue (*b*) and conductor 66, so that a delay of 50 milliseconds after the last opening impulse will again ensue before the feedout of blank tape.

*Inadvertent disconnect*

In the event that the turret operator inadvertently pulls down the cord from a working line, i.e., before the operation of relay TDCO, as described, the false disconnect alarm relay FDAR (FIG. 4), is operated, as follows: The current flowing in the coil of the E relay and the right hand coil of the D relay, which normally flows through the diode D–1 to ground, through the plug and jack sleeve, now flows through the coil of relay FDAR, to ground. Relay D and E thus remain operated and relay FDAR operates and at its left tongue transfers the signaling line from the cord tip to a dummy load resistor DLR to complete the circuit to the line relay LR and keep the printer-perforator from running open. Relay FDAR at tongue (*a*) connects flashing battery from conductor 48, to the neon busy lamp CBL at the turret. At tongue (*b*) relay FDAR grounds conductor 19 of cable C–1 to operate (FIG. 5) the message in complete lamp MIL; and at tongue (*c*) relay FDAR applies ground by lead 20 of cable C–1 to the supervisory lamp SUL (FIG. 5).

To clear out this condition the plug P must be either reconnected to the customer's tie-line or the cord circuit clear out jack COJ on the turret. On transmission of carriage return, carriage return by either the customer or the supervisor's keyboard plugged into the cord circuit jack, relay TDCO will operate after the normal 10 seconds delay and the cord circuit may be pulled down.

The diode D–1 (FIG. 4) between the cord sleeve circuit and the coils of relays D and FDAR prevents the operation of relay FDAR by the current from relay TDCO when the cord is pulled down in the normal manner after the operation of relay TDCO.

*Incomplete message signal*

It was previously mentioned in connection with the operation of relay B–2 (FIG. 7) that during the time the cord circuit is connected to the tie-line, if no signals are transmitted for a period of 90 seconds the incomplete message timer tube MITT (FIG. 6) operates to light the incomplete message lamp MIL. These circuits may be traced more in detail as follows: Upon operation of tube MITT in response to a long cessation of signals current flows through tube MITT over lead 22 of cable C–1, winding of relay MIT–1 and tongue (*a*) of relay MIT–2 and resistor R–10 to ground. Relay MIT–1 operates and at tongue (*b*) operates the supervisory lamp SUL. At tongue (*c*) relay MIT–1 lights the message incomplete lamp MIL and through tongues (*a*) and (*d*) prepares circuits for future use. This condition continues until message transmission recommences, at which time the first spacing impulses received sends current from the space contact S of line relay LR through the lower tongue of the TFO push button (FIG. 6), tongue (*c*) of relay TF–A, tongue (*a*) of relay MIT–1, left coil of relay MIT–2 and resistor R–11 to ground. Relay MIT–2 operates and current then flows from battery through the right coil of MIT–2, its tongue (*b*) and tongue (*d*) of relay MIT–1 to ground, holding MIT–2 operated. Relay MIT–2 when so operated, at tongue (*a*) opens the circuit for relay MIT–1 and connects the coil of MIT–1 over conductor 21 of cable C–1 to the cathode of timing tube MITT to extinguish the tube. Relay MIT–1 then releases, after a slight delay, due to its heel-end slug, and at tongue (*d*) releases relay MIT–2.

*Message waiting indicator*

Figure 6:
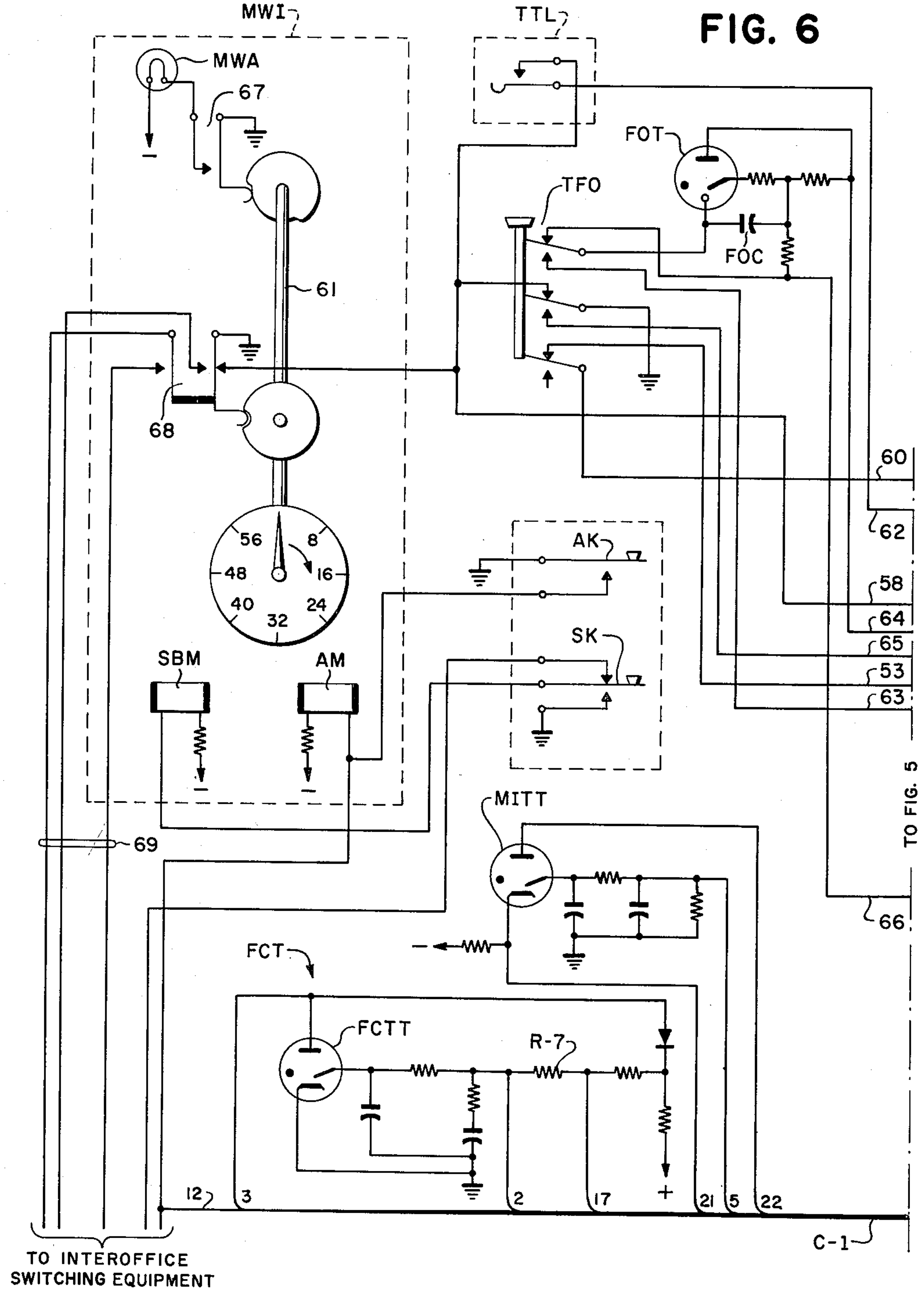
Figure 7:
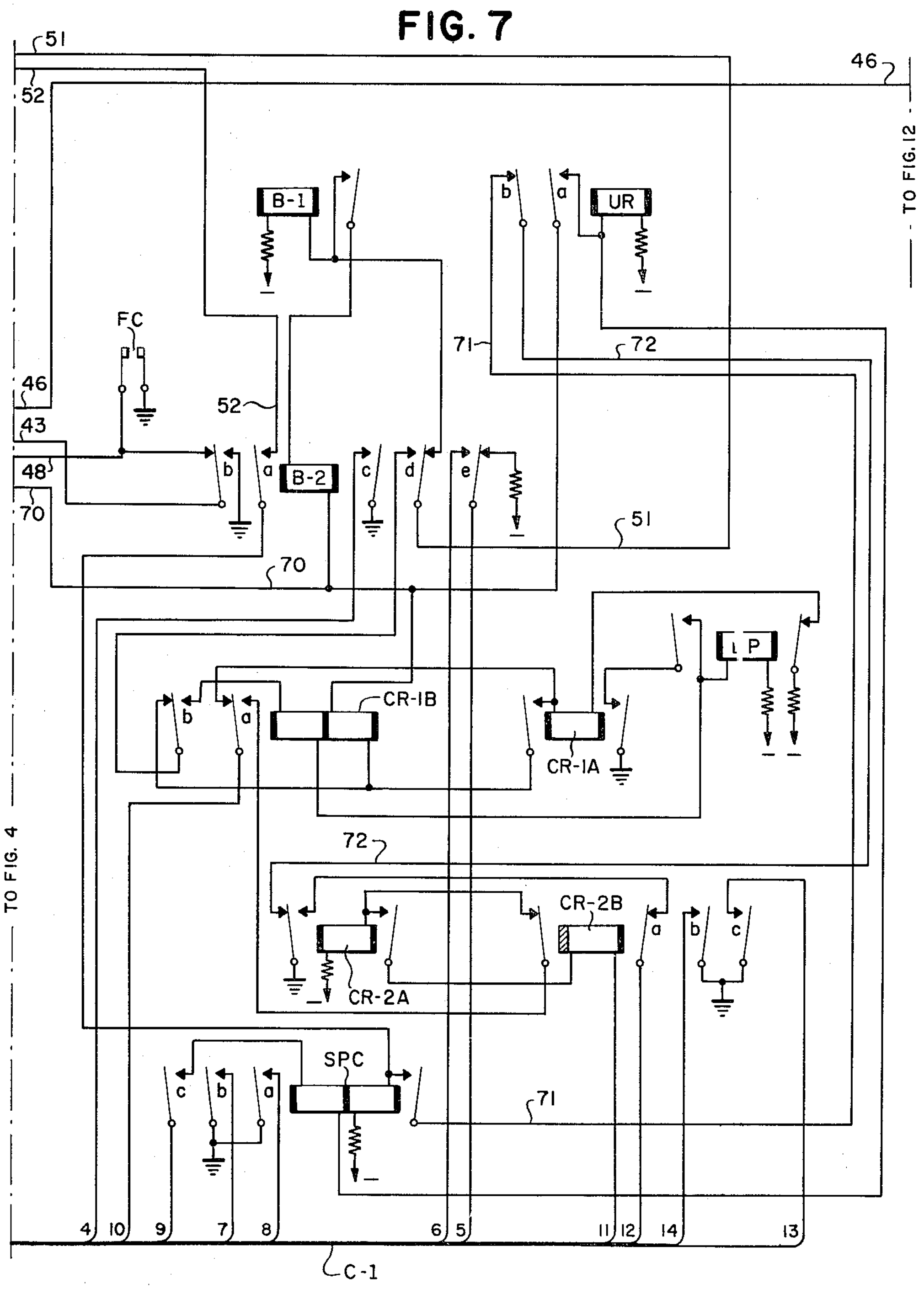

In the foregoing description reference was made to the message waiting indicator MWI of FIG. 6 and the operation of the add magnet AM in response to the reception of a complete message over the cord circuit. This magnet is also supplied with a manual add key AK and a subtract magnet SBM is also provided with a manual substract key SK, whereby the shaft 61 may be manually stepped forward or backward by the add magnet AM or substract magnet SBM, as fully disclosed in the aforesaid Blanton et al. U.S. Patent No. 2,575,329. It is also provided with a signal lamp MWA operated by a cam switch 67 when a predetermined number of messages, as 24, are awaiting transmission, and a second cam operated switch 68 for completing a group of circuits 69 extending to the intra-office switching system, in the manner set forth in said above Blanton et al. patent.

*Stepping of automatic number machine*

Figure 17:
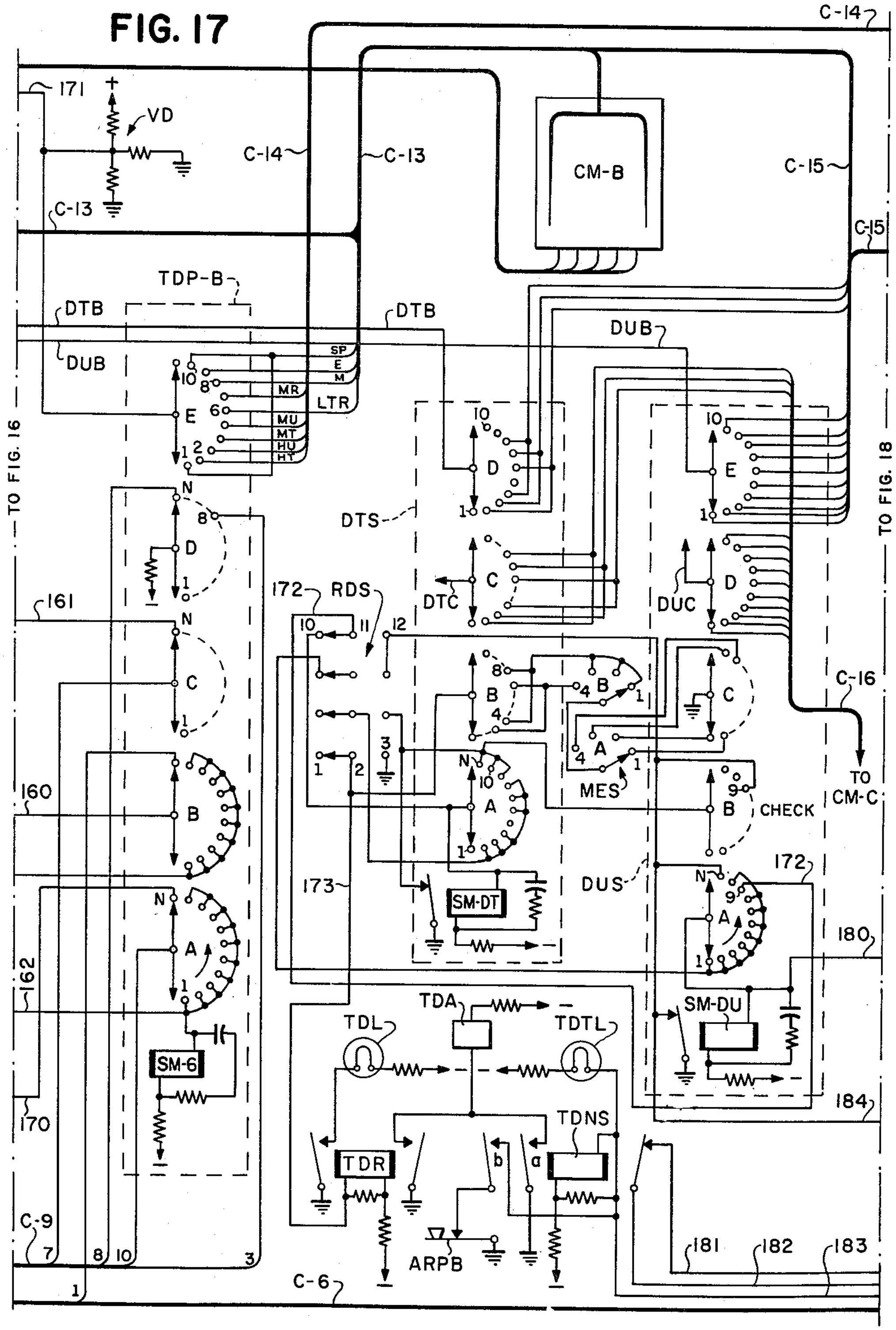
Figure 18:
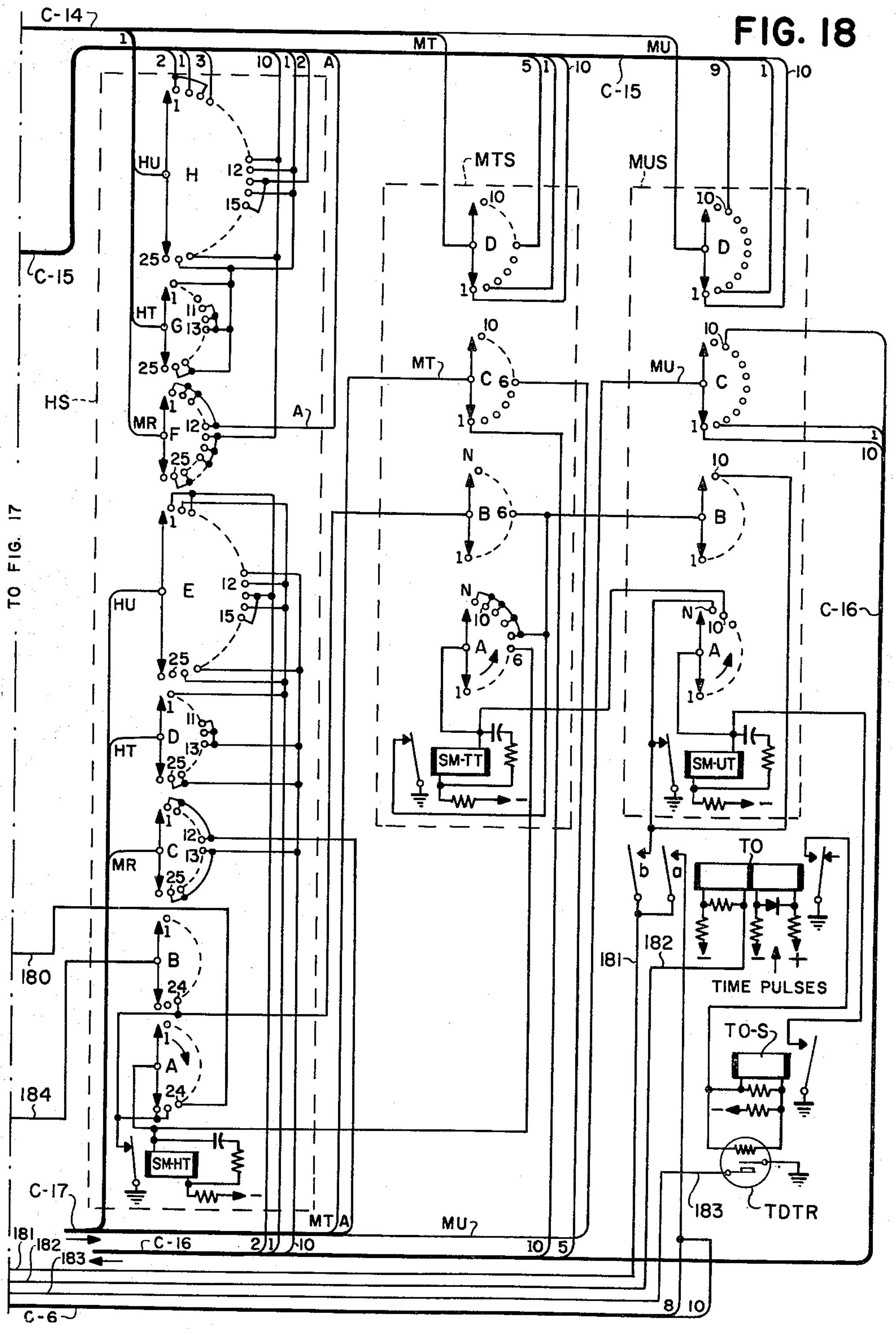
Figure 19:
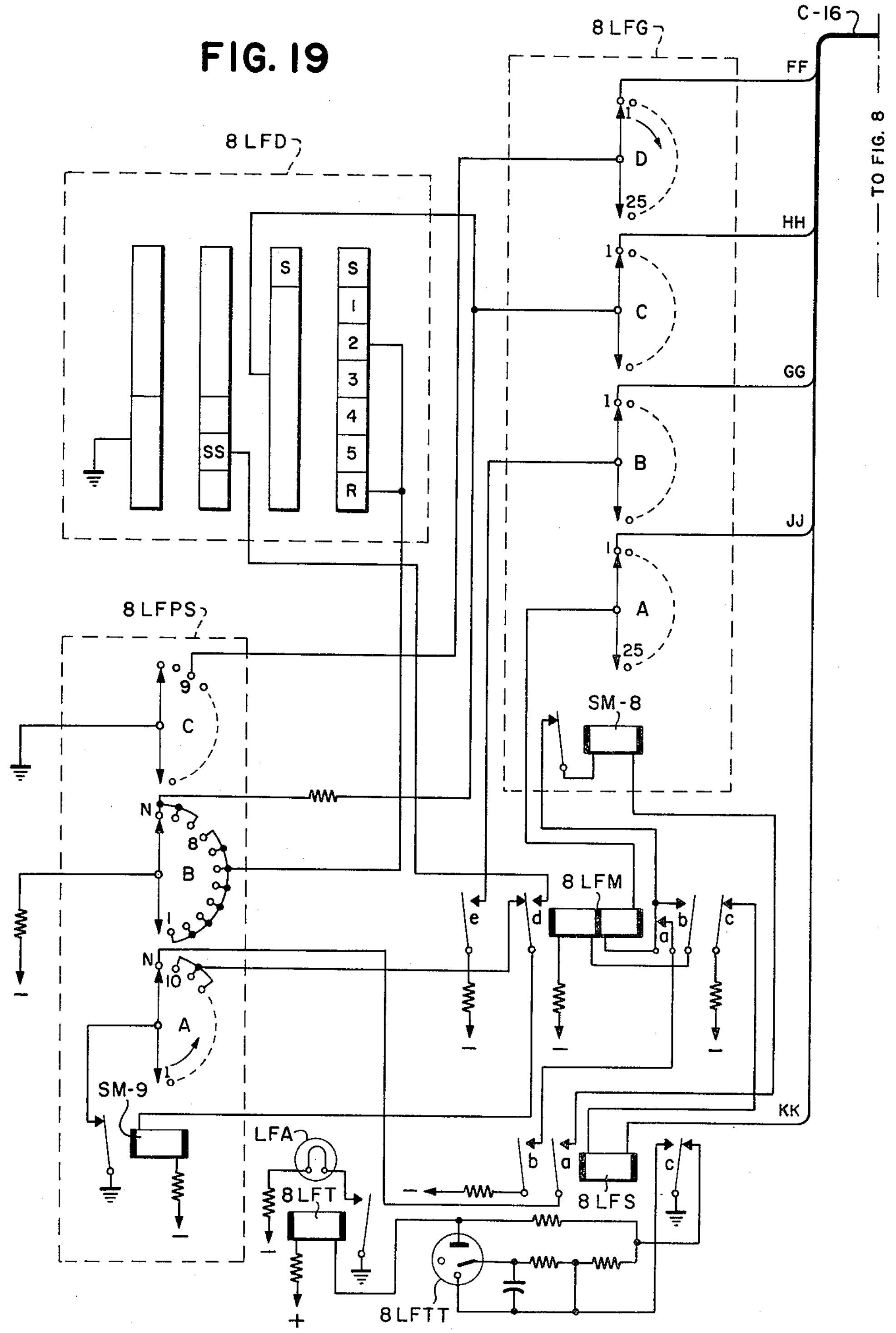
FIG. 19 shows the 8 line feed generator.
Figure 20:
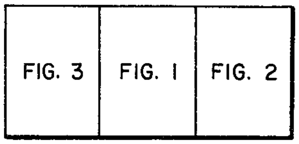
FIG. 20 shows the composite arrangement of FIGS. 1, 2 and 3.
Figure 21:
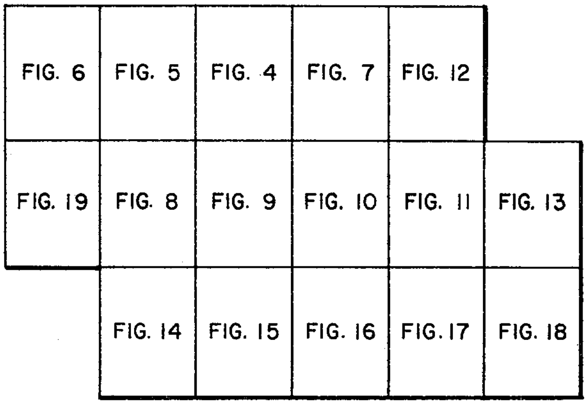
FIG. 21 shows the composite arrangement of FIGS. 4 through 19.

During the description of the top line generator the description of the automatic number machine ANM of FIG. 13 and the time and date switches of FIGS. 17 and 18 was limited to tracing the circuits there through to produce the automatic number codes and the time and date codes. Further description of each of these devices will now be given.

Referring to FIG. 13, it will be noted that each of the hundreds digit, tens digit and units digit switches HS, TS and US, respectively, is provided with a stepping magnet SM–H, SM–T and SM–U and an individual reset key RK–H, RK–T, and RK–U. The machine also has a reset relay NMRS, a reset switch NRS and a step switch NSS. As previously explained the instant number is set up on the top level of each switch which levels are marked by the program switch PSA to set up the digit codes on the code generating matrix of FIG. 11. Also, as explained, the program switch, following each number transmission, grounds conductor S of cable C–12, extending ground to the units step magnet SM–U to step the units switch ahead one step or one digit whereby the sequential numbers are automatically set upon the switches. Each of the switches may be individually advanced by setting the step switch NSS to its upper contact and closing any of the reset buttons RK–H, RK–T or RK–U, whereby to ground the stepping magnets, as desired.

As the program switch PSA steps the unit switch US off of its 10th point (digit 9) onto its normal contact the tens stepping magnet is operated from battery at the magnet, normal point N, level C of switch US, conductor 131 and contacts of step switch NSS and reset switch NRS to ground, thus advancing the tens switch one step to set up the next higher digit on its D level. Likewise switch TS at level C, point N, steps the hundreds switch HS. As step magnet SM–T energizes it extends, through its armature and level B of switch SU the operating ground to the units step magnet SM–U so as to advance the units switch to its 1st point (zero digit). The hundreds step magnet SM–H, likewise steps the tens step magnet from its normal to its first point.

The reset switch NRS when operated to its lower position applies ground from its upper tongue, conductor 132, contacts (*a*) of relay NMRS, conductor 133, middle tongue of switch NRS and wiper, A level, of hundred switch HS, and the bridged points 1 to 10 thereof to the hundreds step magnet SM–H, causing this switch to self-step to its normal point N, from which the ground is extended to the wiper, level A, of tens switch TS and its bridged points to tens step magnet SM–T which self-steps to its normal point and extends the ground to the units switch, which in turn self-steps to normal. When this occurs the ground is extended by conductor 134 to the winding of relay NMRS to operate the same and lock it to ground over its tongue (*b*) and conductor 132. Relay NMRS at tongue (*c*) applies ground to conductor 131 which causes each of the hundreds, tens and units switches to advance one more step to its 1st point as before described. The switch NRS may then be restored to its upper or normal unoperated position.

*Stepping of time and date switches*

Reference will now be had to FIGS. 17 and 18 for a fuller description of the time and date equipment. It will be recalled that the date, that is, the days tens and units digit were derived from the D and E levels, respectively, of the switches DTS, DUS (FIG. 17) under control of the program switch PSB and conductors DTB and DUB of the B unit of the second half of the top line generator. The time and date switches are common to both units of the second half of the top line generator and in an exactly similar manner the days tens and units digits for the C unit are derived from levels C and D of switches DTS and DUS, under control of the program switch PSC (FIG. 15) and conductors DTC and DUC. The points of the C and D levels of switches DTS and DUS are combined in cable C–16, identical to cable C–14, which terminates at the code generating matrix CM–C (FIG. 15). The step magnet SM–DU of switch DUS is stepped once each 24 hours to set up a new days unit digit from ground (to be described) at point 24 level A of the hours digit switch HS (FIG. 18) over conductor 180 and the days ten step magnet is operated once each 10 days to set up a new days ten digit, from the same ground applied over point 9, level A, of switch DUS, conductor 172 and top arm of reset date switch RDS, to step magnet SM–DT. A month end switch MES may be manually set to the number of days in the month, as 28, 29, 30 or 31 to control circuits over levels B and C of switches DTS and DUS, respectively, to operate an alarm relay TDR. Thus in the position of switch MES shown, a circuit extends from ground at wiper, level C of switch DUS, point 2 of this level, point 1 of level A of switch MES, both arms of the switch, point 1 of level B of switch MES, point 4 or 8 of level B of switch DTS and conductor 173 to the winding of relay TDR, whereby this relay will operate when digit 3 is on switch DTS and as switch DUS moves from digit 1 to digit 2, that is at the end of day 31. Relay TDR operates a signal lamp TDL and an audible alarm TDA. With switch MES on points 2 this would have occurred at the end of day 30; on points 3, at the end of day 29; and on point 4, at the end of day 28.

When the alarm sounds the attendant throws reset switch RDS to the right, which at its upper middle arm completes a self stepping circuit for switch DUS over its level A and at its lower-middle arm creates a similar circuit for switch DTS. At its lower arm switch RDS puts holding ground on relay TDR so that it will not release until the reset switch is returned to its left or operating position. At the same time this reset operation is effected, manual switch MES is set in accordance with the number of days in the month then beginning.

Referring now to the time switches HS, MTS and MUS of FIG. 18, levels F, G and H, of switch HS, it will be recalled, supplied the meridian code and the hours tens digits and hours hundreds digit, respectively, to the B unit matrix CM–B over cable C–15. In an exactly similar manner, levels C, D and E supply the same codes over cable C–16 to the C unit matrix CM–C (FIG. 15). Also in the same manner that levels D of switches MTS and MUS supplied the minutes tens and minutes units digit to B unit matrix CM–B, levels C supply these digit pulses to the C unit matrix CM–C over cable C–16 under control of program switch PSC (FIG. 15) and the conductors of cable C–17, corresponding to output cable C–14 of the B unit program switch PSB. Level B of switches HS, MTS, MUS and also switch DUS (FIG. 17) is a check level which operates a signal, as will be described, whenever any step magnet fails to operate at the proper time. Level A controls the stepping of the step magnets SM–HT, SM–TT and SM–UT.

The time step pulses, one per minute, are received from any standard source and applied to the right winding of relay TO. A diode shunting the winding prevents inductive surges on the pulse circuit from releasing this relay, if it is locked up through its left coil. During readout from the time and date switches, it will be recalled that ground was applied to conductor 8 (for unit B or 10 for unit C) of cable C–6 by relay TH of the top line generator. If during this period a time pulse is received, the TO relay will operate and will be held operated over its left winding, conductor 181, right tongue of time delay no-step relay TDNS (FIG. 17), conductor 182, tongue (*a*) of relay TO and to the ground just described on conductor 8 of cable C–6, preventing the time and date switches from stepping until the end of the readout and release of relay TH.

The operation of relay TO operates slave relay TO–S, which is a power relay with heavy contacts to carry the stepping magnet current of all of the stepping magnets, which may all step simultaneously. This circuit extends from ground at the tongue of relay TO–S directly to the minutes unit step magnet SM–UT and through level A of the minute units switch MUS, in its 10th position, to the minutes tens step magnet SM–TT and through point 6, level A of the minutes tens switch MTS to the hour step magnet SM–HT and level A, point 24 of the hours switch HS to the date switch DUS, as previously described.

The circuit for checking the operation of the minutes unit magnet SM–UT is completed through the winding of relay TO, conductor 182, and the right tongue of relay TDNS, conductor 181, tongue (*b*) of relay TO and spring contact of SM–UT to ground. If step magnet SM–UT fails to operate, this ground locks up relay TO and TO–S. The latter relay energizes the thermal relay TDTR starting the same to time. Relay TDTR after a reasonable time, say 10 seconds, operates, to ground conductor 183 extending to the winding of alarm relay TDNS (FIG. 17), and the signal lamp TDTL in parallel.

Relay TDNS operates and locks through its tongue (*b*) and alarm release push button ARPB to ground. At tongue (*a*) it operates the audible alarm TDA and at its right tongue it opens the circuit over conductors 181, 182 to the left winding of relay TO, to effect its release.

If any of the other stepping magnets fails to operate a similar ground is applied to the relay TO over its tongue (*b*) and selected points of the B levels of the various switches. One such circuit extends from tongue (*b*) of relay TO, level B, point 10 of switch MUS to ground at the spring armature of step magnet SM–TT. This circuit also extends onward from level B wiper of switch MUS, point 6, level B of switch MTS and armature of step magnet SM–HT to ground. It may be further extended from point 24, level B of switch HS, over conductor 184 to the spring contact of days units step magnet SM–TU (FIG. 17) to ground, and be still further extended over point 9, level B of switch DUS, to the grounded armature of the days tens step magnet SM–DT. Thus, failure of any step magnet to operate at its proper time causes alarm relay TDNS to operate.

While the invention has been described with respect to a particular installation having a definite top line format, it is to be understood that the principle of adding supplemental information at one point to a message originating at another point is equally applicable to use in other situations, and further that the nature of the supplemental information may be varied, together with the manner of generating the same, with respect to both fixed and variable characters, all without departing from the essential attributes of the invention, and we contemplate all variations and changes in the system as may be included within the scope of the appended claims.

What we claim is:

1. A telegraph system comprising a central office, a plurality of patrons' offices, a tie-line extending from each patron's office to said central office, a transmitter at each patron's office connected to said tie-line, a perforator at said central office for recording code signals transmitted from a patron's office, a code signal generator at said central office, tie-line identification means associated with said signal generator and said tie-lines, means responsive to a predetermined code signal received at said central office over one of said tie-lines for initiating said signal generator into operation to generate a plurality of successive identification character code signals individual to said one of said tie-lines and transmitting means at said central office for transmitting said last mentioned code signals to said perforator.

2. A telegraph system as defined in claim 1 having a recorder at said patron's office connected to said tie-line, said transmitting means at said central office also being connected to said tie-line to transmit simultaneously said tie-line identification code signals to said recorder.

3. A telegraph system as defined in claim 1, in which said character code generator comprises a coding device having an input conductor for each code to be generated and an output conductor for each unit of the codes to be generated and program means including said tie-line identification means for energizing said input conductors one at a time to generate said plurality of successive tie-line identification character code signals individual to one of said tie-lines.

4. A telegraph system as defined in claim 1 in which said code signal generator comprises a coding device having an input conductor for each code to be generated and an output conductor for each unit of the codes to be generated and sequentially operated program means, said program means in predetermined positions of its sequential operation being electrically associated with said tie-line identification means to energize said input conductors selectively, one at a time to generate said successive code signals individual to said one of said tie-lines.

5. A telegraph system comprising a central office, a plurality of patrons' offices, a tie-line extending from each patron's office to said central office, a transmitter at each patron's office connected to said tie-line, a perforator at said central office for recording code signals transmitted from a patron's office, a code signal generator at said central office common to said tie-lines and including a sequentially operable program means and a coding device, means responsive to a predetermined code signal received at said central office over any one of said tie-lines for seizing for use said code generator and initiating said program means into a cycle of operation to selectively activate said coding device periodically to generate successively a plurality of predetermined code signals, a switch operable into different positions, said switch being electrically associated with said coding device variably in accordance with the position thereof, said coding device, in certain positions of operation of said program means, being actuated under joint control of said program means and said switch, to generate code signals determined by the operated position of said switch and transmitting means for transmitting the signals generated by said coding device to said perforator.

6. A telegraph system as defined in claim 5 which includes a second code generator at said central office, means controlled by the first mentioned code generator for seizing for use said second code generator, means for releasing said first mentioned code generator at the end of the cycle of operation of said program means and for initiating the second code generator into operation, said second code generator having means for generating additional code signals and transmitting means for transmitting said code signals to said perforator.

7. A telegraph system comprising a central office, a plurality of patrons' offices, a tie-line extending from each patron's office to said central office, a transmitter and a printer at each patron's office connected to said tie-line, a plurality of cord circuits at said central office each including a perforator, a code generator at said central office common to said cord circuits, means for connecting any one of said cord circuits to any one of said tie-lines for interconnecting the cord circuit perforator with the tie-line transmitter, cord circuit identification means included in said code generator, means in said cord circuit responsive to signals transmitted over said connected tie-line for initiating said code generator into operation to generate code signals representing the code designation of the connected cord circuit and transmitting means for transmitting said last mentioned code signals to said perforator.

8. A telegraph system comprising a central office, a plurality of patrons' offices, a tie-line extending from each patron's office to said central office, a transmitter and a printer at each patron's office connected to said tie-line, a plurality of cord circuits at said central office each including a perforator, a code generator at said central office common to said cord circuits, means for connecting any one of said cord circuits to any one of said tie-lines for interconnecting the cord circuit perforator with the patrons transmitter, cord circuit identification means and tie-line identification means both included in said code generator, means in said cord circuit responsive to signals transmitted over said connected tie-line for initiating said code generator into operation to generate code signals representing the code designation of both said cord circuit and said connected tie-line and transmitting means for transmitting said last mentioned code signals to said perforator.

9. A telegraph system comprising a central office, a plurality of patrons' offices, a tie-line extending from each patron's office to said central office, a transmitter and a printer at each patron's office connected to said tie-line, a plurality of cord circuits at said central office each including a perforator, a code generator at said central office common to said cord circuits, said code generator including a multi-position program switch having a predetermined cycle of operation and a coding device for generating code signals, means for connecting any one of said cord circuits to any one of said tie-lines for interconnecting the cord circuit perforator with the tie-line, cord circuit identification means included in said code generator, means in said cord circuit responsive to signals transmitted over said connected tie-line for seizing for use said code generator and initiating said program switch into a cycle of operation, means for directly connecting said program switch to said coding device to generate predetermined fixed codes in certain positions of operation of the program switch and means for jointly connecting said program switch and said cord circuit identification means with said coding device, in at least one position of said program switch, to produce variable codes and transmitting means for transmitting the code signals generated by said coding device to said perforator.

10. A telegraph system comprising a central office, a plurality of patrons' offices, a tie-line extending from each patron's office to said central office, a transmitter and a printer at each patron's office connected to said tie-line, a plurality of cord circuits at said central office common to said cord circuits, said code generator including a multi-position program switch having predetermined cycle of operation, means for connecting any one of said cord circuits to any one of said tie-lines for interconnecting the cord circuit perforator with the tie-line transmitter, cord circuit identification means and tie-line identification means both included in said code generator, means in said cord circuit responsive to signals transmitted over said connected tie-line for seizing for use said code generator, and initiating said program switch into a cycle of operation, and coding means directly controlled by said program switch in certain positions of operation thereof to produce predetermined code signals, said coding means being jointly controlled by said program switch and said cord circuit identification means, in at least one other position of said program switch, to produce signals representing the code designation of said cord circuit, said coding means being further jointly controlled by said program switch and said tie-line identification means, in still other positions of said program switch, to produce signals representing the code designation of the tie-line, and transmitting means for transmitting the signals produced by said coding device to said perforator.

11. A telegraph system comprising a central office, a plurality of patrons' offices, a tie-line extending from each patron's office to said central office, a transmitter and a printer at each patron's office connected to said tie-line, a plurality of cord circuits at said central office each including a perforator, a code generator at said central office common to said cord circuits, means for connecting any one of said cord circuits to any one of said tie-lines for interconnecting the cord circuit perforator with the tie-line for the reception of signals transmitted from said patron's office over said connected tie-line, means responsive to signals transmitted from said patron's office for seizing for use said code generator and initiating the same through a cycle of operation, and means in the code generator for generating top-line information including code signals representing the code designation of said central office, the code designation of the cord circuit and the code designation of the tie-line connected thereto, and transmitting means in said code generator for transmitting said top-line information both to said perforator and said patron's recorder.

12. A telegraph system as defined in claim 11 having timing means set into operation in response to said code generator initiate signals, means to disable said timer upon the completion of the cycle of operation of said code generator and supervisory signalling means operated by said timer when said cycle is not completed within a prescribed time after reception of said code generator initiate signals.

13. A telegraph system as defined in claim 11 having means operable at the end of said cycle of operation for releasing said generator and rendering the same available for seizure by another cord circuit, a second code generator common to all cord circuits, means under control of said first mentioned code generator for seizing said second code generator, means for initiating the second code generator through a cycle of operation at the end of said first mentioned cycle, means in said second code generator for generating additional top-line information including signals representing the geographical location of said connected patron's office, a transmitter for transmitting said latter top-line signals to said cord circuit perforator and to said patron's printer and means for releasing said second code generator at the end of its cycle of operation.

14. A telegraph system as defined in claim 13 in which a third code generator is provided at said central office common to all of the cord circuits, means in the cord circuit responsive to an end-of-message signal received over said tie-line for seizing for use said third code generator and initiating it into a cycle of operation to generate message acceptance code signals, transmitting means for transmitting said message acceptance signals to said tie-line and means operative at the end of said cycle of operation of said third code generator for disconnecting the cord circuit from said tie-line.

15. A telegraph system comprising a central office, a plurality of remote stations, a line connecting the central office with each of said stations, an intra-office switching system at said central office, means for preparing perforated tape for use in said intra-office system comprising means for completing a transmission circuit between said perforator and any one of said lines for the reception of code signals over the connected line, a primary code generator and a plurality of secondary code generators, at said central office, means responsive to code signals received at said central office for seizing for use said primary code generator and initiating the same through a cycle of operation, means controlled by said primary code generator for seizing for use an idle one of said secondary code generators, means operable at the end of the cycle of operation of said primary code generator for releasing the same for use with another line and for initiating the seized second code generator into a cycle of operation, said code generators having means for generating top-line code signals representative of the identity of the connected line, the geographical location of the connected station, the central office identity, the message number and the instant time and date, top line transmitting means for each of said code generators, means for connecting said top line transmitting means into said transmission circuit for transmitting said generated code signals to said perforator to produce a top line of information, and means operative upon the completion of operation of said secondary code generator for eliminating said top line transmitting means from said transmission circuit to condition the same for reception of message and end-of-message signals from said connected station.

16. A telegraph system comprising a central office, a plurality of patron's offices, a tie-line extending from each patron's office to said central office, a transmitter and a printer at each patron's office connected to said tie-line, a plurality of cord circuits at said central office each including a perforator, a code generator at said central office common to said cord circuits, means for connecting any one of said cord circuits to any one of said tie-lines for interconnecting the cord circuit perforator with the tie-line for the reception of signals transmitted from said patron's office over said connected tie-line, said code generator comprising a cord circuit finder switch, a tie-line identification switch and a program switch having a predetermined cycle of operation, a coding device and a transmitter, means responsive to code signals received over a connected tie-line for seizing for use said code generator and initiating said cord circuit finder switch into a position of operation whereby to connect the cord circuit to said transmitter, means to initiate said tie-line identification switch into a position of operation to correspond to the connected tie-line, means operative following the completion of the operation of the cord circuit finder switch and the tie-line identification switch for initiating said program switch through a cycle of operation, said coding device being activated under control of said program switch, said cord circuit finder switch and said tie-line identification switch to produce signals in certain positions of said program switch representing said positions, producing signals in at least one other position of said program switch representing the position of said cord circuit finder switch and producing signals in still other positions of said program switch representing the position of said tie-line identification switch, and means including said transmitter for transmitting the signals produced by said coding device to said recorder.

17. A telegraph system comprising a central office, a plurality of patron's offices, a tie-line extending from each patron's office to said central office, a transmitter and a printer at each patron's office connected to said tie-line, a plurality of cord circuits at said central office each including a perforator, a code generator at said central office common to said cord circuits, means for connecting any one of said cord circuits to any one of said tie-lines for interconnecting the cord circuit perforator with the tie-line for the reception of signals transmitted from said patron's office over said connected tie-line, said code generator comprising a cord circuit finder switch, a tie-line identification rotary switch and a program rotary switch having a predetermined cycle of operation, each of said switches having a plurality of rows of contact, a coding device and a transmitter, means responsive to code signals received over a connected tie-line for seizing said code generator and initiating said cord circuit finder switch into a position of operation whereby to connect the cord circuit to said transmitter, means to initiate said tie-line identification switch into a position of operation to correspond to the connected tie-line, means operative following the completion of the operation of the cord circuit finder switch and the tie-line identification switch for initiating said program switch through a cycle of operation, said coding device being activated under control of one row of contacts only of said program switch, said cord circuit finder switch and said tie-line identification switch to produce signals in certain positions of said program switch representing said positions, producing signals in at least one other position of said program switch representing the position of said cord circuit finder switch and producing signals in still other positions of said program switch representing the position of said tie-line identification switch, and means including said transmitter for transmitting the signals produced by said coding device to said recorder.

18. A telegraph system comprising a source of code signals, a recorder for receiving said signals, a code generator including a program switch and a coding device having an input conductor for each code to be generated, an output conductor for each unit of the codes to be generated, means including said program switch for energizing said input conductors one at a time, and electrically conductive devices connected between each of said input conductors and predetermined ones of said output conductors, in coded relation, said devices serving effectively to conduct in one direction only, means responsive to signals received from said source for initiating said program switch through a cycle of operation to periodically energize one of said input conductors, means associated with said output conductors for generating code signals in response to such energization and means for transmitting the code signals so generated to said recorder.

19. A telegraph system comprising a source of code signals, a recorder for receiving said signals, a code generator including a program switch and a coding device having an input conductor for each code to be generated, an output conductor for each unit of the codes to be generated, means including said program switch for applying a predetermined potential to said input conductors one at a time, and gas-filled, cold cathode glow discharge devices connected between each of said input conductors and predetermined ones of said output conductors in coded relation, said potential being of an order to effect conduction through said devices in one direction only, means responsive to signals received from said source for initiating said program switch through a cycle of operation to periodically energize one of said input conductors, means associated with said output conductors for generating code signals in response to such energization and means for transmitting the code signals so generated to said recorder.

20. A telegraph system, a code generator including a program switch and a coding device having an input conductor for each code to be generated, an output conductor for each unit of the codes to be generated, means including said program switch for applying a predetermined potential to said input conductors one at a time, and gas-filled, cold cathode glow discharge devices connected between each of said input conductors and predetermined ones of said output conductors, in coded relation, said potential being of an order to effect conduction through said devices in one direction only, means for initiating said program switch through a cycle of operation to periodically energize one of said input conductors, and means associated with said ouput conductors for generating code signals in response to such energization.

21. A telegraph system, a code generator including a program switch having a plurality of rows of contacts and a coding device having an input conductor for each code to be generated, an output conductor for each unit of the codes to be generated, means including one row of contacts only of said program switch for energizing said input conductors one at a time, and electrically conductive devices connected between each of said input conductors and predetermined ones of said output conductors, in coded relation, said devices serving effectively to conduct in one direction only, means for initiating said program switch through a cycle of operation to periodically energize one of said input conductors, and means associated with said output conductors for generating code signals in response to such energization.

22. A telegraph system, a code generator including a program switch having a plurality of rows of contacts and a coding device having an input conductor for each code to be generated, an output conductor for each unit of the codes to be generated, means including one row of contacts only of said program switch for energizing said input conductors one at a time, selectively operable means for varying the order of energization of said input conductors by said program switch and electrically conductive devices connected between each of said input conductors and predetermined ones of said output conductors, in coded relation, said devices serving effectively to conduct in one direction only, means for initiating said program switch through a cycle of operation to periodically energize one of said input conductors, and means associated with said output conductors for generating code signals in response to such energization.

References Cited in the file of this patent

UNITED STATES PATENTS

| | | |
|---|---|---|
| 1,872,842 | Storch | Aug. 23, 1932 |
| 2,339,803 | Potts | Jan. 25, 1944 |